US 6,570,709 B2

(12) United States Patent
Katayama et al.

(10) Patent No.: US 6,570,709 B2
(45) Date of Patent: May 27, 2003

(54) SUBSTRATE PROVIDED WITH ANTIREFLECTION FILMS AND ITS PRODUCTION METHOD

(75) Inventors: Yoshihito Katayama, Yokohama (JP); Yukio Kimura, Aiko-gun (JP); Mikako Maekawa, Yokohama (JP); Eiji Shidoji, Yokohama (JP); Kazuyoshi Noda, Aiko-gun (JP)

(73) Assignee: Asahi Glass Company, Limited, Tokyo (JP)

( * ) Notice: Subject to any disclaimer, the term of this patent is extended or adjusted under 35 U.S.C. 154(b) by 0 days.

(21) Appl. No.: 09/912,362

(22) Filed: Jul. 26, 2001

(65) Prior Publication Data

US 2002/0051294 A1 May 2, 2002

(30) Foreign Application Priority Data

Jul. 27, 2000 (JP) .......................... 2000-226960

(51) Int. Cl.[7] ................................. G02B 1/11
(52) U.S. Cl. ...................... 359/586; 359/580
(58) Field of Search .................. 359/580, 581, 359/586

(56) References Cited

U.S. PATENT DOCUMENTS

| | | | | |
|---|---|---|---|---|
| 5,153,062 A | * | 10/1992 | Grolig et al. ............. | 428/332 |
| 5,194,990 A |   | 3/1993  | Boulos et al. ............. | 359/587 |
| 5,473,468 A | * | 12/1995 | Rudigier et al. .......... | 359/359 |
| 5,618,626 A | * | 4/1997  | Nagashima et al. ...... | 428/423.1 |
| 5,691,044 A |   | 11/1997 | Oyama et al. ............ | 359/585 |
| 5,744,227 A |   | 4/1998  | Bright et al. ............. | 359/586 |
| 5,750,267 A | * | 5/1998  | Takase et al. ............ | 219/522 |
| 5,935,716 A |   | 8/1999  | McCurdy et al. ......... | 359/586 |
| 5,942,319 A |   | 8/1999  | Oyama et al. ............ | 359/585 |
| 5,991,081 A | * | 11/1999 | Haaland et al. ........... | 359/580 |
| 6,172,812 B1 | * | 1/2001 | Haaland et al. ........... | 359/580 |
| 6,358,617 B1 |   | 3/2002  | Ohsaki et al. ............ | 359/585 |

FOREIGN PATENT DOCUMENTS

| | | | |
|---|---|---|---|
| EP | 0 515 847 | | 12/1992 |
| EP | 0 934 912 | | 8/1999 |
| JP | 4-357134 | | 10/1992 |
| JP | 4-357135 | | 10/1992 |
| JP | 06-064940 A | * | 3/1994 |
| WO | WO 94/04356 | * | 3/1994 |
| WO | WO 97/28467 | * | 8/1997 |
| WO | WO 00/33110 | | 6/2000 |

* cited by examiner

Primary Examiner—John Juba, Jr.
(74) Attorney, Agent, or Firm—Oblon, Spivak, McClelland, Maier & Neustadt, P.C.

(57) ABSTRACT

The present invention provides a substrate with antireflection films, which has excellent antireflection properties to incident light at an oblique angle from the film face side and high transmittance. Moreover, the antireflection films of the present invention provide a reflection color tone that does not tend to be bluish. This object is achieved where the substrate with antireflection films comprises a transparent substrate and at least two antireflection film layers deposited on one side of the transparent substrate as described herein.

16 Claims, 8 Drawing Sheets

SUBSTRATE PROVIDED WITH ANTIREFLECTION FILMS AND ITS PRODUCTION METHOD

The present invention relates to a substrate provided with antireflection films and its production method. Particularly, it relates to a substrate provided with antireflection films which prevents the reflection color tone from becoming bluish even when the angle of incidence is small, which is thereby used suitably for a window of a transport such as a windshield of an automobile, and its production method.

Conventionally, since the reflectance of visible light (hereinafter sometimes referred to simply as reflectance) from the film face side (interior side) of a windshield of an automobile is high, the color tone of e.g. the interior has been limited to one based on dark tone color (such as black), in order to suppress reflection of the dashboard and its surrounding, and to increase visibility of the driver. That has significantly restricted the color of the car interior and significantly limited the design of an automobile.

It has also been desired to suppress reflection on a rear glass of an automobile although there is no problem in visibility of the driver.

In recent years, the setting angle of a windshield and a rear glass tends to be acute from the viewpoint of the appearance design, and accordingly the problem of the reflection on the interior face tends to be more significant.

Accordingly, it has been required to reduce the reflectance on the interior face of e.g. a windshield and to increase the allowable range of the interior design.

As a method to achieve such requirements, it has been known to form an antireflection film on the surface of e.g. a windshield. For example, the following methods have been proposed such as 1) a method of forming a transparent multi-layer antireflection film (JP-A-4-357134, JP-A-4-357135, JP-A-6-305775, JP-A-8-152501), and 2) a method of forming a transparent single-layer antireflection film.

On the other hand, a windshield or a rear glass for an automobile is required to shield the direct solar radiation light as much as possible from the viewpoint of the temperature in the car, and a green type heat absorbing glass is mainly used at present. Accordingly, it is desired that a windshield also is achromatic or green from the viewpoint of the appearance design of an automobile.

However, of the transparent film obtained by the above method 1) or 2), the reflection color tone tends to be bluish in a case where the angle of incidence of visible light is small, such as in a case of from 0° to 30° for example, and the above requirements can not be met with such a film.

Further, the method 1) is to form a known multi-layer antireflection film by wet method. In a case of forming three layers, the total film thickness is so thick as at least about 250 nm, and the cost required for the production is high.

In the method 2), in the case of the vacuum deposition, $MgF_2$ may be coated. However, it is necessary to form a film on a hot substrate in order to make $MgF_2$ have an adequate strength, and stability of the film thickness distribution which is characteristic of the deposition is inadequate, such being problematic in productivity.

On the other hand, a new type multi-layer antireflection film comprising a light absorbing film as a constituent has been proposed (JP-A-64-70701, U.S. Pat. No. 5,091,244). However, if this multi-layer antireflection film is directly applied to a windshield for an automobile, no adequate antireflection performance will be obtained in a case where the angle of incidence is great, or the reflection color tone tends to be yellowish or reddish.

Further, an antireflection film comprising the above light absorbing film absorbs light, whereby the transmittance tends to be low. A green type heat absorbing glass which is generally used for a glass for an automobile at present tends to slightly decrease the transmittance at the visible light region. Accordingly, if a light absorbing film and a heat absorbing glass are combined, the transmittance will be considerably low, and the combination may be restricted according to regulatory regarding the transmittance of a windshield for an automobile in each country.

Production of a windshield for an automobile most advantageously comprises coating on a flat glass substrate, followed by cutting, bending and lamination. However, no conventional antireflection film has a high heat temperature processing resistance to a high temperature of from 560 to 700° C. during a bending step in production of a windshield for an automobile. For example, when tin oxide is used for an antireflection film as a material having a moderate refractive index, refractive index and other optical performances change due to crystallinity at a high temperature, and cracks or peeling may result on a film due to change in volume. Particularly, among glasses having a transparent multi-layer antireflection film obtained as mentioned above 1), a glass having at least three antireflection film layers has a total film thickness of at least about 250 nm and is so thick, and accordingly the film may have cracks during high-temperature bending step, and it is impossible to form such a film by the above step.

Further, a conventional antireflection film is by no means resistant to a heat treatment for tempering.

Under these circumstances, it is an object of the present invention to provide a substrate provided with antireflection films, which is excellent in antireflection performance to incident light at an oblique angle from the film face side, which has a high transmittance, and with which the reflection color tone does not tend to be bluish not only in a case where the angle of incidence of visible light from the non-film face side is great but also in a case where it is small.

Another object of the present invention is to provide a substrate provided with antireflection films, which is excellent in antireflection performance to incident light at an oblique angle from the film face side, which has a high transmittance, with which the reflection color tone does not tend to be bluish not only in a case where the angle of incidence of visible light from the non-film face side is great but also in a case where it is small, and which is excellent in heat resistance.

A further object of the present invention is to provide a method for easily producing a substrate provided with antireflection films, subjected to bending or tempering, which is excellent in antireflection performance to incident light at an oblique angle from the film face side, which has a high transmittance, and with which the reflection color tone does not tend to be bluish not only in a case where the angle of incidence of visible light from the non-film face side is great but also in a case where it is small.

A still further object of the present invention is to provide a glass for an automobile, which is excellent in antireflection performance to incident light at an oblique angle from the film face side, which has a high transmittance, and with which the reflection color tone does not tend to be bluish not only in a case where the angle of incidence of visible light from the non-film face side is great but also in a case where it is small.

The present invention provides (1) a substrate provided with antireflection films, which comprises a transparent substrate and at least two antireflection film layers deposited (coated) on one side of the transparent substrate, wherein the reflectance on the film face of light incident at an angle of incidence of 5° from the film face side is at most 6% at the entire wavelength region ranging from 400 to 480 nm.

The present invention further provides (2) a substrate provided with antireflection films, which comprises a transparent substrate and first and second antireflection film layers deposited (coated) in this order on one side of the transparent substrate, wherein the first layer is a thin film having a refractive index of from 1.6 to 2.6 and a geometrical film thickness (hereinafter sometimes referred to simply as "film thickness") of from 1.1 to 1.9 times the film thickness as an antireflection condition as obtained from the following formula; and the second layer is a thin film having a refractive index of from 1.4 to 1.56 and a film thickness of from 0.5 to 1.1 times the film thickness as an antireflection condition as obtained from the following formula:

$$d=\lambda/[4n\{1-(\sin\theta/n)^2\}^{1/2}]$$

wherein d is a film thickness as an antireflection condition of each layer, n is a refractive index of each layer, $\lambda=550$ nm and $\theta=60°$.

The present invention further provides (3) the substrate provided with antireflection films according to the above item (1) or (2) which comprises a transparent substrate and first and second antireflection film layers deposited (coated) in this order on one side of the transparent substrate, wherein the first layer is a thin film having a refractive index of from 1.6 to 2.6 and a film thickness of from 60 to 200 nm; and the second layer is a thin film having a refractive index of from 1.4 to 1.56 and a film thickness of from 50 to 140 nm.

The present invention further provides (4) the substrate provided with antireflection films according to any one of the above items (1) to (3), which comprises a transparent substrate and first and second antireflection film layers deposited (coated) in this order on one side of the transparent substrate, wherein the first layer is a thin film containing an oxide, an oxynitride or an oxycarbide of at least one element selected from the group consisting of titanium, silicon, zinc, aluminum, tin, zirconium, tantalum, tungsten, bismuth and niobium, or a nitride or a nitrogen carbide of at least one element selected from the group consisting of silicon, aluminum and boron.

The present invention further provides (5) the substrate provided with antireflection films according to any one of the above items (1) to (4), which comprises a transparent substrate and first and second antireflection film layers deposited (coated) in this order on one side of the transparent substrate, wherein the second layer is a thin film containing an oxide of silicon.

The present invention further provides (6) a substrate provided with antireflection films, which comprises a transparent substrate and first and second antireflection film layers deposited (coated) in this order on one side of the transparent substrate, wherein the first layer is a tin oxynitride film having a film thickness of from 104 to 124 nm; and the second layer is a silicon oxide film having a film thickness of from 85 to 105 nm.

The present invention further provides (7) a substrate provided with antireflection films, which comprises a transparent substrate and first, second and third antireflection film layers deposited (coated) in this order on one side of the transparent substrate, wherein the first and second layers are thin films having compositions which are different from each other, each having a refractive index of from 1.6 to 2.5, and at least one of the first and second layers having a film thickness of from 0.04 to 0.9 time the film thickness as an antireflection condition as obtained from the following formula; and the third layer is a thin film having a refractive index of from 1.4 to 1.5 and a film thickness of from 0.4 to 1.1 times the film thickness as an antireflection condition as obtained from the following formula:

$$d=\lambda/[4n\{1-(\sin\theta/n)^2\}^{1/2}]$$

wherein d is a film thickness as an antireflection condition of each layer, n is a refractive index of each layer, $\lambda=550$ nm and $\theta=60°$.

The present invention further provides (8) the substrate provided with antireflection films according to the above item (1) or (7), which comprises a transparent substrate and first, second and third antireflection film layers deposited (coated) in this order on one side of the transparent substrate, wherein the first and second layers are thin films having compositions which are different from each other, each having a refractive index of from 1.6 to 2.5, and at least one of the first and second layers having a film thickness of from 2 to 95 nm; and the third layer is a thin film having a refractive index of from 1.4 to 1.5 and a film thickness of from 44 to 138 nm.

The present invention further provides (9) the substrate provided with antireflection films according to the above item (1), (7) or (8), which comprises a transparent substrate and first, second and third antireflection film layers deposited (coated) in this order on one side of the transparent substrate, wherein the first and second layers are thin films having compositions different from each other, each containing an oxide, an oxynitride or an oxycarbide of at least one element selected from the group consisting of titanium, silicon, zinc, aluminum, tin, zirconium, tantalum, tungsten, bismuth and niobium, or a nitride or a nitrogen carbide of at least one element selected from the group consisting of silicon, aluminum and boron.

The present invention further provides (10) the substrate provided with antireflection films according to the above item (1), (7), (8) or (9), which comprises a transparent substrate and first, second and third antireflection film layers deposited (coated) in this order on one side of the transparent substrate, wherein the third layer is a thin film containing an oxide of silicon.

The present invention further provides (11) a substrate provided with antireflection films, which comprises a transparent substrate and first, second and third antireflection film layers deposited (coated) in this order on one side of the transparent substrate, wherein the first layer is a tin oxynitride film having a film thickness of from 70 to 130 nm, the second layer is a titanium oxide film having a film thickness of from 1 to 25 nm, and the third layer is a silicon oxide film having a film thickness of from 80 to 130 nm.

The present invention further provides (12) a substrate provided with antireflection films, which comprises a transparent substrate and first, second and third antireflection film layers deposited (coated) in this order on one side of the transparent substrate, wherein the first layer is a titanium oxide film having a film thickness of from 1 to 25 nm, the second layer is a tin oxynitride film having a film thickness of from 70 to 130 nm, and the third layer is a silicon oxide film having a film thickness of from 80 to 130 nm.

The present invention further provides (13) the substrate provided with antireflection films according to any one of the above items (1) and (7) to (12), which comprises a transparent substrate and first, second and third antireflection film layers deposited (coated) in this order on one side of the transparent substrate, wherein the total thickness of the three antireflection film layers (sum of the film thicknesses of the first, second and third layers) is less than 250 nm.

The present invention further provides (14) the substrate provided with antireflection films according to any one of the above items (1) to (13), wherein each layer has an extinction coefficient of at most 0.05 at the visible light region.

The present invention further provides (15) a method for producing a substrate provided with antireflection films, which comprises subjecting the substrate provided with antireflection films as defined in any one of the above items (1) to (14) to a heat treatment to produce the substrate provided with antireflection films having bending or tempering applied thereto.

The present invention further provides (16) a method for producing a laminated glass, which comprises subjecting the transparent substrate provided with antireflection films as defined in any one of the above items (1) to (14) wherein the transparent substrate is glass, to bending into a three-dimensional curved shape by a heat treatment, and laminating the glass substrate provided with antireflection films subjected to bending and another glass substrate having approximately the same shape by means of an intermediate film.

The present invention further provides (17) a window glass for an automobile which uses the substrate provided with antireflection films as defined in any one of the above items (1) to (14).

Now, the present invention will be described in detail with reference to the preferred embodiments.

Figure 1:
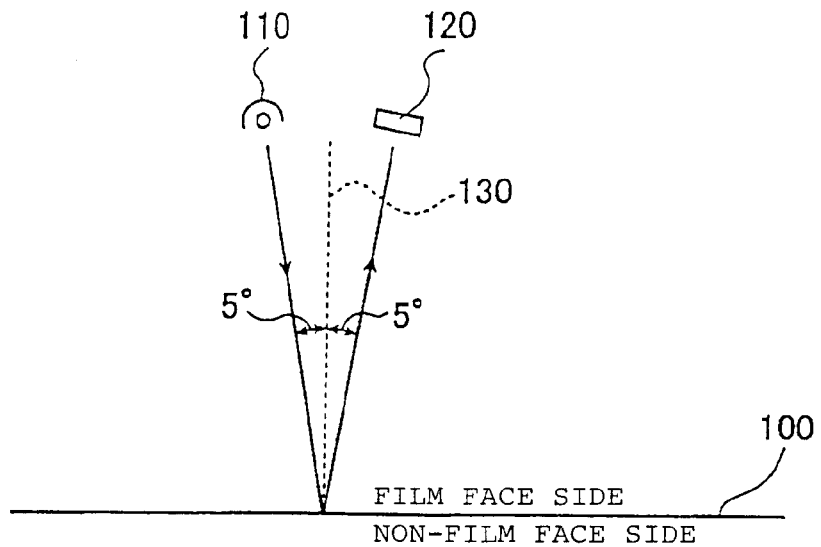
FIG. 1 is a diagram explaining the reflectance on the film face of light incident at an angle of incidence of 5° from the film face side.

Now, the transparent substrate which is employed in every aspect of the present invention in common will be explained below.

The transparent substrate to be used in the present invention is not particularly limited to the transparent and colorless material, and a colored material may also be employed so long as the transmittance is so low as not to impair the object of the present invention. For example, glass or a plastic may be mentioned.

The glass is not particularly limited, and a transparent or colored float glass (glass produced by float method) or a colored heat absorbing glass may, for example, be mentioned. Particularly in a case where the present invention is applied to a glass for an automobile, it is preferred to use a heat absorbing glass from the viewpoint of decrease in the direct solar radiation energy. Further, a tempered glass may also be used.

As a plastic, a transparent or colored polycarbonate or polymethyl methacrylate may, for example, be mentioned.

The transparent substrate to be used in the present invention may be a laminate of a first transparent substrate, an intermediate film and a second transparent substrate. As the first and second transparent substrates, the above-described transparent substrates may optionally be combined. As the intermediate film, a transparent or colored polyvinyl butyral or ethylenevinyl acetate may, for example, be mentioned. The laminate to be used in the present invention may be any optional combination. For example, a laminated glass employing glass as the first and second transparent substrates and polyvinyl butyral as the intermediate film may be mentioned. Specific examples of a preferred laminate include a laminated glass employing any of a heat absorbing glass, a highly heat absorbing glass and a ultraviolet-absorbing glass as each of the first and second transparent substrates and polyvinyl butyral as the intermediate film. Particularly preferred is a laminated glass employing a highly heat absorbing glass as each of the first and second transparent substrates and polyvinyl butyral as an intermediate film. When such a glass having a low transmittance is used, the reflectance on the non-film face side of light incident from the film face tends to decrease. Such a glass is suitably used for a window of a transport (such as a window of a vehicle) or a covering for a meter equipment. It is particularly suitable for a window glass (particularly a windshield or a rear glass) of an automobile.

The substrate provided with antireflection films of the present invention may be provided with a functional film such as an antireflection film on the side opposite to the side on which the antireflection films are formed.

The substrate provided with antireflection films of a first aspect of the present invention is a substrate provided with antireflection films which comprises a transparent substrate and at least two antireflection film layers deposited (coated) on one side of the transparent substrate, wherein the reflectance on the film face of light incident at an angle of incidence of 5° from the film face side is at most 6% at the entire wavelength region ranging from 400 to 480 nm.

The number of layers of the antireflection film is not particularly limited so long as it is at least two, but the number of layers is preferably two or three.

In the present invention, the reflectance on the film face of light incident from the film face side is a ratio of the reflected light reflected on the film face to the incident light in a case of light incident from the film face side of the substrate provided with antireflection films. Accordingly, the reflectance on the film face is obtained from the reflected light on the film face excluding the reflected light reflected on the non-film face (the side having no films).

Specifically, in order to measure the reflection on the antireflection film face side alone, the non-film face which is opposite to the antireflection film face side is coated with a black paint, and the reflectance at each wavelength is measured.

In the present invention, as illustrated in FIG. 1, the reflectance in a case where the reflected light of light incident at an angle of incidence of 5° is received at a position at an angle of reflection of 5° is employed. In FIG. 1, light emitted from a light source 110, incident at an angle of incidence of 5° to a normal 130 of a substrate 100 provided with antireflection films, is reflected on the film face of the substrate 100 provided with antireflection films at an angle of reflection of 5° to the normal 130 and reaches a light-receiving portion 120, and the reflectance is measured.

The substrate provided with antireflection films of the present invention has a reflectance on the film face of at most 6% at the entire wavelength region ranging from 400 to 480 nm as obtained above by using light incident at an angle of 5°, whereby the reflection color tone observed from the non-film face side of the substrate provided with antireflection films does not tend to be bluish not only in a case where the angle of incidence is great but also in a case where it is small, and the reflection color tone may be neutral if desired.

In a case where the substrate provided with antireflection films of the present invention is used as a windshield of an automobile, it is usually used in such a manner that the film face faces the interior (car interior) side and the non-film face faces the exterior (car exterior) side. Accordingly, the reflection color tone to be problematic from the viewpoint of the appearance design is a color tone of reflected light, incident from the non-film face side, on the non-film face and the film face.

Namely, the present invention is to specify the reflectance of light incident from the film face side at a specific angle of incidence, at a specific wavelength region, so that the reflection color tone of light incident from the non-film face side to be problematic does not tend to be bluish not only in a case where the angle of incidence is great but also in a case where it is small, and the reflection color tone may be neutral if desired.

In the present invention, the reflectance on the film face of light incident at an angle of incidence of 5° from the film face side is preferably at most 4% at the entire wavelength region ranging from 400 to 480 nm, whereby the reflection color tone observed from the non-film face side is less likely to be bluish.

Further, in the present invention, the wavelength region as a standard is from 400 to 480 nm, but the reflectance on the film face of light incident at an angle of incidence of 5° from the film face side is preferably at most 6%, more preferably at most 4%, at the entire wavelength region ranging from 400 to 700 nm, whereby the reflection color tone observed from the non-film face side is neutral.

Further, in the present invention, the angle of incidence of the incident light is 5°, but the reflectance is preferably within the above range also in a case where the angle of incidence is from 0° to 10°.

The substrate provided with antireflection films of a second aspect of the present invention is a substrate provided with antireflection films, which comprises a transparent substrate and first and second antireflection film layers deposited (coated) in this order on one side of the transparent substrate, wherein the first layer is a thin film having a refractive index of from 1.6 to 2.6 and a film thickness of from 1.1 to 1.9 times the film thickness as an antireflection condition as obtained from the following formula; and the second layer is a thin film having a refractive index of from 1.4 to 1.56 and a film thickness of from 0.5 to 1.1 times the film thickness as an antireflection condition as obtained from the following formula:

$$d=\lambda/[4n\{1-(\sin\theta/n)^2\}^{1/2}]$$

wherein d is a film thickness as an antireflection condition of each layer, n is a refractive index of each layer, $\lambda=550$ nm and $\theta=60°$.

Accordingly, the reflection color tone observed from the non-film face side of the substrate provided with antireflection films does not tend to be bluish not only in a case where the angle of incidence is great but also in a case where it is small, and the reflection color tone may be neutral if desired.

The substrate provided with antireflection films of the second aspect of the present invention is provided with two antireflection film layers, wherein each of the first and second layers has a refractive index within a specific ranges, and each layer has a film thickness within a specific range depending upon the refractive index, to obtain a desired reflection color tone.

The angle $\theta=60°$ is to suppose that the incident light is light incident at an oblique angle.

Figure 11:
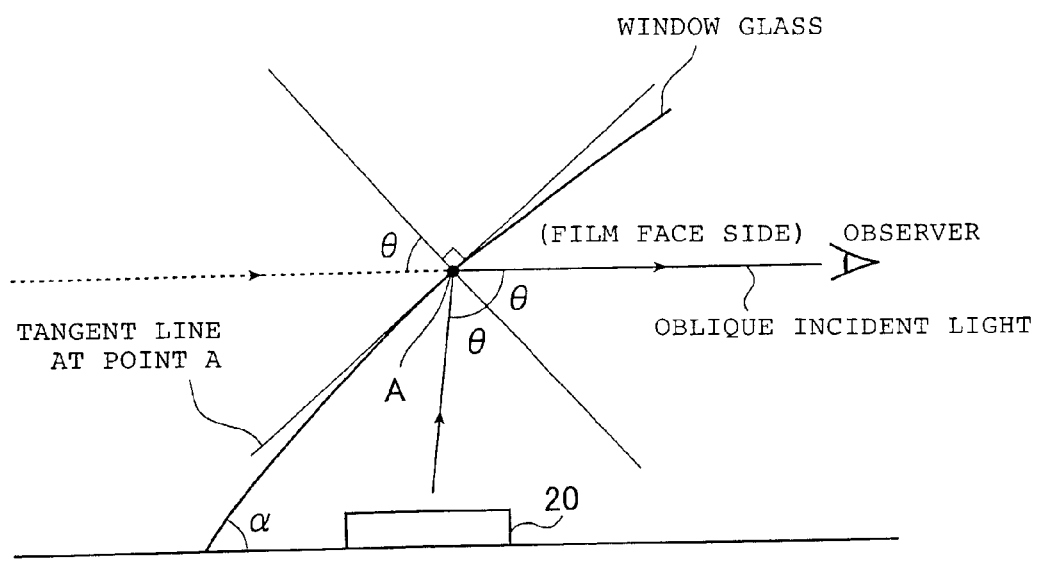
FIG. 11 is a diagram explaining incident light at an oblique angle on the film face side.

FIG. 11 is a diagram explaining incident light at an oblique angle in the present invention. When the setting angle of a glass plate to a transport is $\alpha°$, and the line of sight of an observer (driver) is in the horizontal direction (the observer gazes into the infinite distance), the line of sight of the observer and the glass plate cross each other at point A, and the angle formed by the line of sight of the observer and the line perpendicular to the tangent line of the glass plate at point A is about $(90-\alpha)°$ $(=\theta°)$.

On the other hand, interior light (such as light around the dashboard 20) incident at an angle of about $\theta°$ at the point A will reach the observer, according to Snell laws of reflection.

The angle of incidence of light usually means the angle formed by the direction perpendicular to the reflection plane and the direction of the incident light. In a case where the setting angle of the glass plate is $\alpha°$, the angle of incidence of light from the film face side (interior side) is about $\theta°$. For example, when the setting angle $\alpha$ is 30°, the incident light from the film face side is light incident at an angle of 60°.

Hereinafter "the angle of incidence" will be referred to as the angle of incidence of light from the film face side unless otherwise specified.

The refractive index is a refractive index at a wavelength of 550 nm. Materials of the first and second layers are not particularly limited so long as each layer has a refractive index within the above specified range.

The film thickness of each of the first and second layers is specified by a relation with the film thickness as an antireflection condition. Here, the film thickness as an antireflection condition is generally obtained in accordance with the following formula:

$$d=\lambda/[4n\{1-(\sin\theta/n)^2\}^{1/2}]$$

wherein d is a film thickness as an antireflection condition and n is a refractive index.

In the present invention, the film thickness as an antireflection condition of each layer is obtained from the refractive index of each layer under conditions of $\lambda=550$ nm and $\theta=60°$.

The first layer has a film thickness of from 1.1 to 1.9 times the film thickness as an antireflection condition of the first layer as obtained from the above formula. The second layer has a film thickness of from 0.5 to 1.1 times the film thickness as an antireflection condition of the second layer as obtained from the above formula.

Namely, in the second aspect of the present invention, the film thicknesses are set based on the film thicknesses as antireflection conditions in a case where the wavelength is 550 nm and the angle of incidence is 60° so that the first layer becomes thicker than the above film thickness and the second layer becomes thinner than that.

For e.g. a windshield of an automobile, the film thicknesses are set to values of the film thicknesses as antireflection conditions as obtained from the above formula so that the reflection of light incident at an angle of 60° is prevented. On the contrary, in the present invention, the film thicknesses are made to depart from the above film thicknesses as antireflection conditions, namely, the reflectance in a case of the angle of incidence of 60° is slightly impaired to bring the reflection color tone observed from the non-film face side to be desired one not only in a case where the angle of incidence is great but also in a case where it is small.

In the second aspect of the present invention, preferred combinations of the refractive indices and the ratios (magnifications) of the film thicknesses relative to the film thicknesses as antireflection conditions of the first and second layers are shown in Table 1.

TABLE 1

| No. | First layer Refractive index | First layer Magnification | Second layer Refractive index | Second layer Magnification |
|---|---|---|---|---|
| 1 | 1.6~1.7 | 1.1~1.6 | 1.4~1.5 | 0.7~1.1 |
| 2 | 1.7~1.8 | 1.2~1.6 | 1.4~1.5 | 0.7~0.78 |
| 3 | 1.7~1.8 | 1.32~1.6 | 1.4~1.5 | 0.78~1.0 |
| 4 | 1.8~1.9 | 1.2~1.8 | 1.4~1.5 | 0.6~1.0 |
| 5 | 1.9~2.2 | 1.2~1.9 | 1.4~1.5 | 0.5~1.0 |
| 6 | 2.2~2.6 | 1.4~1.9 | 1.4~1.5 | 0.6~0.9 |
| 7 | 1.9~2.2 | 1.4~1.8 | 1.5~1.56 | 0.6~0.9 |
| 8 | 2.2~2.6 | 1.4~1.8 | 1.5~1.56 | 0.6~0.9 |

Among them, particularly preferred combinations are shown in Table 2.

TABLE 2

| No. | First layer Refractive index | First layer Magnification | Second layer Refractive index | Second layer Magnification |
|---|---|---|---|---|
| 1 | 1.65 | 1.34 | 1.40 | 0.91 |
| 2 | 1.70 | 1.38 | 1.40 | 0.87 |
| 3 | 1.75 | 1.47 | 1.40 | 0.91 |
| 4 | 1.80 | 1.44 | 1.40 | 0.87 |
| 5 | 1.85 | 1.53 | 1.40 | 0.81 |
| 6 | 1.90 | 1.56 | 1.40 | 0.84 |
| 7 | 1.95 | 1.63 | 1.40 | 0.81 |
| 8 | 2.00 | 1.59 | 1.40 | 0.81 |
| 9 | 2.05 | 1.66 | 1.40 | 0.78 |
| 10 | 2.10 | 1.72 | 1.40 | 0.75 |
| 11 | 2.15 | 1.75 | 1.40 | 0.75 |
| 12 | 2.20 | 1.72 | 1.40 | 0.75 |
| 13 | 2.25 | 1.75 | 1.40 | 0.72 |
| 14 | 2.30 | 1.75 | 1.40 | 0.75 |
| 15 | 1.70 | 1.34 | 1.42 | 0.91 |
| 16 | 1.75 | 1.44 | 1.42 | 0.84 |
| 17 | 1.80 | 1.53 | 1.42 | 0.84 |
| 18 | 1.85 | 1.53 | 1.42 | 0.78 |
| 19 | 1.90 | 1.50 | 1.42 | 0.87 |
| 20 | 1.95 | 1.50 | 1.42 | 0.84 |
| 21 | 2.00 | 1.53 | 1.42 | 0.87 |
| 22 | 2.05 | 1.72 | 1.42 | 0.72 |
| 23 | 2.10 | 1.63 | 1.42 | 0.78 |
| 24 | 2.15 | 1.75 | 1.42 | 0.69 |
| 25 | 2.20 | 1.75 | 1.42 | 0.75 |
| 26 | 2.25 | 1.78 | 1.42 | 0.69 |
| 27 | 2.30 | 1.75 | 1.42 | 0.72 |
| 28 | 2.35 | 1.75 | 1.42 | 0.69 |
| 29 | 1.75 | 1.44 | 1.44 | 0.84 |
| 30 | 1.80 | 1.53 | 1.44 | 0.78 |
| 31 | 1.85 | 1.44 | 1.44 | 0.87 |
| 32 | 1.90 | 1.47 | 1.44 | 0.81 |
| 33 | 1.95 | 1.47 | 1.44 | 0.81 |
| 34 | 2.00 | 1.47 | 1.44 | 0.84 |
| 35 | 2.05 | 1.59 | 1.44 | 0.78 |
| 36 | 2.10 | 1.63 | 1.44 | 0.78 |
| 37 | 2.15 | 1.66 | 1.44 | 0.78 |
| 38 | 2.20 | 1.56 | 1.44 | 0.84 |
| 39 | 2.25 | 1.78 | 1.44 | 0.69 |
| 40 | 2.30 | 1.72 | 1.44 | 0.75 |
| 41 | 1.80 | 1.47 | 1.46 | 0.81 |
| 42 | 1.85 | 1.53 | 1.46 | 0.78 |
| 43 | 1.90 | 1.47 | 1.46 | 0.84 |
| 44 | 1.95 | 1.53 | 1.46 | 0.78 |
| 45 | 2.00 | 1.50 | 1.46 | 0.81 |
| 46 | 2.05 | 1.53 | 1.46 | 0.78 |
| 47 | 2.10 | 1.56 | 1.46 | 0.78 |
| 48 | 2.15 | 1.59 | 1.46 | 0.78 |
| 49 | 2.20 | 1.63 | 1.46 | 0.78 |
| 50 | 2.25 | 1.66 | 1.46 | 0.78 |
| 51 | 2.30 | 1.69 | 1.46 | 0.75 |
| 52 | 2.35 | 1.75 | 1.46 | 0.72 |
| 53 | 2.40 | 1.75 | 1.46 | 0.72 |
| 54 | 1.90 | 1.53 | 1.48 | 0.78 |
| 55 | 1.95 | 1.53 | 1.48 | 0.81 |
| 56 | 2.00 | 1.56 | 1.48 | 0.78 |
| 57 | 2.05 | 1.56 | 1.48 | 0.78 |
| 58 | 2.10 | 1.56 | 1.48 | 0.78 |
| 59 | 2.15 | 1.56 | 1.48 | 0.78 |
| 60 | 2.20 | 1.56 | 1.48 | 0.78 |
| 61 | 2.25 | 1.63 | 1.48 | 0.75 |
| 62 | 2.30 | 1.66 | 1.48 | 0.78 |
| 63 | 2.35 | 1.72 | 1.48 | 0.72 |
| 64 | 2.40 | 1.69 | 1.48 | 0.78 |
| 65 | 2.45 | 1.72 | 1.48 | 0.75 |
| 66 | 2.50 | 1.75 | 1.48 | 0.72 |
| 67 | 2.10 | 1.59 | 1.50 | 0.78 |
| 68 | 2.20 | 1.63 | 1.50 | 0.78 |
| 69 | 2.30 | 1.63 | 1.50 | 0.75 |
| 70 | 2.40 | 1.69 | 1.50 | 0.75 |

The substrate provided with antireflection films according to a third aspect of the present invention is a substrate provided with antireflection films, which comprises a transparent substrate and first and second antireflection film layers deposited (coated) in this order on one side of the transparent substrate according to the first and/or second aspect of the present invention, wherein the first layer is a thin film having a refractive index of from 1.6 to 2.6 and a film thickness of from 60 to 200 nm; and the second layer is a thin film having a refractive index of from 1.4 to 1.56 and a film thickness of from 50 to 140 nm.

Accordingly, the reflection color tone observed from the non-film face side of the substrate provided with antireflection films does not tend to be bluish not only in a case where the angle of incidence is great but also in a case where it is small, and the reflection color tone may be neutral if desired.

The refractive index is a refractive index at a wavelength of 550 nm. Materials of the first and second layers are not particularly limited so long as each layer has a refractive index within the above specified range.

The substrate provided with antireflection films according to the third aspect of the present invention is provided with two antireflection film layers, wherein each of the first and second layers has a refractive index and a film thickness within a specific range, whereby a desired reflection color tone can be obtained.

In the third aspect of the present invention, preferred combinations of refractive indices and film thicknesses of the first and second layers are shown in Table 3.

TABLE 3

| | First layer | | Second layer | |
|---|---|---|---|---|
| No. | Refractive index | Geometrical film thickness (nm) | Refractive index | Geometrical film thickness (nm) |
| 1 | 1.6~1.7 | 103~150 | 1.4~1.5 | 90~130 |
| 2 | 1.7~1.8 | 100~155 | 1.4~1.5 | 80~105 |
| 3 | 1.7~1.8 | 110~160 | 1.4~1.5 | 105~130 |
| 4 | 1.8~1.9 | 100~155 | 1.4~1.5 | 70~125 |
| 5 | 1.9~2.2 | 90~150 | 1.4~1.5 | 65~125 |
| 6 | 2.2~2.6 | 90~130 | 1.4~1.5 | 70~115 |
| 7 | 1.9~2.2 | 90~130 | 1.5~1.56 | 70~100 |
| 8 | 2.2~2.6 | 90~120 | 1.5~1.56 | 70~100 |

Among them, particularly preferred combinations are shown in Table 4.

TABLE 4

| | First layer | | Second layer | |
|---|---|---|---|---|
| No. | Refractive index | Geometrical film thickness (nm) | Refractive index | Geometrical film thickness (nm) |
| 1 | 1.65 | 131.6 | 1.40 | 113.3 |
| 2 | 1.70 | 129.2 | 1.40 | 109.4 |
| 3 | 1.75 | 132.8 | 1.40 | 113.3 |
| 4 | 1.80 | 125.3 | 1.40 | 109.4 |
| 5 | 1.85 | 128.8 | 1.40 | 101.6 |
| 6 | 1.90 | 127.0 | 1.40 | 105.5 |
| 7 | 1.95 | 127.9 | 1.40 | 101.6 |
| 8 | 2.00 | 121.6 | 1.40 | 101.6 |
| 9 | 2.05 | 122.6 | 1.40 | 97.7 |
| 10 | 2.10 | 123.5 | 1.40 | 93.8 |
| 11 | 2.15 | 122.3 | 1.40 | 93.8 |
| 12 | 2.20 | 116.9 | 1.40 | 93.8 |
| 13 | 2.25 | 115.9 | 1.40 | 89.8 |
| 14 | 2.30 | 112.9 | 1.40 | 93.8 |
| 15 | 1.70 | 126.5 | 1.42 | 110.7 |
| 16 | 1.75 | 130.0 | 1.42 | 103.1 |
| 17 | 1.80 | 133.4 | 1.42 | 103.1 |
| 18 | 1.85 | 128.8 | 1.42 | 95.5 |
| 19 | 1.90 | 122.0 | 1.42 | 106.9 |
| 20 | 1.95 | 118.1 | 1.42 | 103.1 |
| 21 | 2.00 | 116.8 | 1.42 | 106.9 |
| 22 | 2.05 | 127.2 | 1.42 | 87.8 |
| 23 | 2.10 | 116.8 | 1.42 | 95.5 |
| 24 | 2.15 | 122.3 | 1.42 | 84.0 |
| 25 | 2.20 | 119.0 | 1.42 | 91.6 |
| 26 | 2.25 | 117.9 | 1.42 | 84.0 |
| 27 | 2.30 | 112.9 | 1.42 | 87.8 |
| 28 | 2.35 | 110.1 | 1.42 | 84.0 |
| 29 | 1.75 | 130.0 | 1.44 | 100.8 |
| 30 | 1.80 | 133.4 | 1.44 | 93.4 |
| 31 | 1.85 | 120.9 | 1.44 | 104.6 |
| 32 | 1.90 | 119.4 | 1.44 | 97.1 |
| 33 | 1.95 | 115.6 | 1.44 | 97.1 |
| 34 | 2.00 | 112.0 | 1.44 | 100.8 |
| 35 | 2.05 | 117.9 | 1.44 | 93.4 |
| 36 | 2.10 | 116.8 | 1.44 | 93.4 |
| 37 | 2.15 | 115.7 | 1.44 | 93.4 |
| 38 | 2.20 | 106.2 | 1.44 | 100.8 |
| 39 | 2.25 | 117.9 | 1.44 | 82.2 |
| 40 | 2.30 | 110.9 | 1.44 | 89.6 |
| 41 | 1.80 | 128.0 | 1.46 | 95.0 |
| 42 | 1.85 | 128.8 | 1.46 | 91.4 |
| 43 | 1.90 | 119.4 | 1.46 | 98.7 |
| 44 | 1.95 | 120.5 | 1.46 | 91.4 |
| 45 | 2.00 | 114.4 | 1.46 | 95.0 |
| 46 | 2.05 | 113.3 | 1.46 | 91.4 |
| 47 | 2.10 | 112.3 | 1.46 | 91.4 |
| 48 | 2.15 | 111.4 | 1.46 | 91.4 |
| 49 | 2.20 | 110.5 | 1.46 | 91.4 |
| 50 | 2.25 | 109.7 | 1.46 | 91.4 |
| 51 | 2.30 | 108.9 | 1.46 | 87.7 |
| 52 | 2.35 | 110.1 | 1.46 | 87.7 |
| 53 | 2.40 | 107.5 | 1.46 | 84.1 |
| 54 | 1.90 | 124.5 | 1.48 | 89.5 |
| 55 | 1.95 | 120.5 | 1.48 | 93.1 |
| 56 | 2.00 | 119.2 | 1.48 | 89.5 |
| 57 | 2.05 | 115.6 | 1.48 | 89.5 |
| 58 | 2.10 | 112.3 | 1.48 | 89.5 |
| 59 | 2.15 | 109.2 | 1.48 | 89.5 |
| 60 | 2.20 | 106.2 | 1.48 | 89.5 |
| 61 | 2.25 | 107.6 | 1.48 | 85.9 |
| 62 | 2.30 | 106.9 | 1.48 | 89.5 |
| 63 | 2.35 | 108.2 | 1.48 | 82.3 |
| 64 | 2.40 | 103.7 | 1.48 | 89.5 |
| 65 | 2.45 | 103.1 | 1.48 | 85.9 |
| 66 | 2.50 | 102.6 | 1.48 | 82.3 |
| 67 | 2.10 | 114.5 | 1.50 | 87.7 |
| 68 | 2.20 | 110.5 | 1.50 | 87.7 |
| 69 | 2.30 | 104.9 | 1.50 | 84.2 |
| 70 | 2.40 | 103.7 | 1.50 | 84.2 |

With respect to the substrate provided with antiflection films of the first aspect of the present invention wherein the number of antireflection film layers is two, and the substrates provided with antireflection films of the second and third aspects of the present invention, the materials of the antireflection films are not particularly limited. However, the first layer is preferably a thin film containing an oxide, an oxy-nitride or an oxy-carbide of at least one element selected from the group consisting of titanium, silicon, zinc, aluminum, tin, zirconium, tantalum, tungsten, bismuth and niobium, or a nitride or a nitrogen carbide of at least one element selected from the group consisting of silicon, aluminum and boron, and the second layer is preferably a thin film containing an oxide of silicon from the viewpoint of the refractive index. By using such materials, not only the transmittance is high, but also it tends to be easy to satisfy the conditions in each of the first, second and third aspects of the present invention.

Particularly, the first layer is preferably a thin film consisting of any of (1) oxynitride of tin, (2) mixed oxide of zirconium and silicon, (3) oxide of titanium, (4) mixed oxide of titanium and silicon, (5) oxycarbide of silicon, (6) oxynitride of silicon, (7) oxynitride of aluminum and (8) nitride of aluminum. Further, the second layer is preferably a thin film consisting of any one of (1) oxide of silicon, (2) mixed oxide of silicon and aluminum and (3) oxynitride of silicon, whereby optical properties do not substantially change even after a heat treatment, and mechanical properties after the heat treatment are good. Particularly, the first layer is preferably a thin film consisting of an oxynitride of tin or an oxide of titanium from the viewpoint of heat resistance during heat treatment as mentioned hereinafter.

The substrate provided with antireflection films according to a fourth aspect of the present invention is a substrate provided with antireflection films, which comprises a transparent substrate and first and second antireflection film layers deposited (coated) in this order on one side of the transparent substrate, wherein the first layer is a tin oxynitride film having a film thickness of from 104 to 124 nm; and the second layer is a silicon oxide film having a film thickness of from 85 to 105 nm.

Accordingly, the reflection color tone observed from the non-film face side of the substrate provided with antireflection films does not tend to be bluish not only in a case where the angle of incidence is great but also in a case where it is small, and the reflection color tone may be neutral if desired.

Further, by the above film stack, the change in volume of the film tends to be small even if a heat treatment is carried out, no cracks or peeling tends to be formed, and optical properties tend to be maintained.

Here, the first layer has to be a substantial tin oxynitride film and may contain another element as an impurity. Further, the second layer has to be a substantial silicon oxide film and may contain another element as an impurity.

The first layer has a film thickness of preferably from 109 to 121 nm, and the second layer has a film thickness of preferably from 90 to 100 nm.

The substrate provided with antireflection films according to a fifth aspect of the present invention is a substrate provided with antireflection films, which comprises a transparent substrate and first, second and third antireflection film layers deposited (coated) in this order on one side of the transparent substrate, wherein the first and second layers are thin films having compositions which are different from each other, each having a refractive index of from 1.6 to 2.5, and at least one of the first and second layers having a film thickness of from 0.04 to 0.9 time the film thickness as an antireflection condition as obtained from the following formula; and the third layer is a thin film having a refractive index of from 1.4 to 1.5 and a film thickness of from 0.4 to 1.1 times the film thickness as an antireflection condition as obtained from the following formula:

$$d=\lambda/[4n\{1-(\sin\theta/n)^2\}^{1/2}]$$

wherein d is a film thickness as an antireflection condition of each layer, n is a refractive index of each layer, $\lambda$=550 nm and $\theta$=60°.

Accordingly, the reflection color tone observed from the non-film face side of the substrate provided with antireflection films does not tend to be bluish not only in a case where the angle of incidence is great but also in a case where it is small, and the reflection color tone may be neutral if desired.

The substrate provided with antireflection films according to the fifth aspect of the present invention is provided with three antireflection film layers, wherein each of the first, second and third layers has a refractive index within a specific range and has a film thickness within a specific range depending upon the refractive index to obtain a desired reflection color tone.

The refractive index is a refractive index at a wavelength of 550 nm. Materials of the first, second and third layers are not particularly limited so long as each layer has a refractive index within the above range. However, the first and second layers have compositions which are different from each other.

The film thickness of each of the first, second and third layers is specified by the relation with the above film thickness as antireflection condition. The conditions to obtain the film thickness as an antireflection condition are the same as in the case of the second aspect of the present invention.

At least one of the first and second layers is required to have a film thickness of from 0.04 to 0.9 time the film thickness as an antireflection condition of each layer as obtained from the above formula, however, not both layers are required to have a film thickness within the above range.

The film thickness of the third layer is from 0.4 to 1.1 times the film thickness as an antireflection condition of the third layer as obtained from the above formula.

Namely, in the fifth aspect of the present invention, the film thicknesses of the first, second and third layers are set based on the film thicknesses as antireflection conditions in a case where the wavelength is 550 nm and the angle of incidence is 60°.

In the fifth aspect of the present invention, the total film thickness (sum of the film thicknesses of the first, second and third layers) is preferably less than 250 nm. When the total film thickness is less than 250 nm, properties after heat treatment as mentioned hereinafter tend to be excellent.

In the fifth aspect of the present invention, particularly preferred combinations of the refractive indices and the ratios (magnifications) of the film thicknesses relative to the film thicknesses as antireflection conditions of the first, second and third layers are shown in Table 5.

Among them, No. 1 and No. 4 in Table 5 are preferred since the film stack to achieve the object of the present invention has a wide variety, and particularly preferred is No. 1. In No. 2 and No. 3, the difference in the refractive index between the first and second layers is preferably less than 0.3 from the viewpoint of the reflection color tone and the reflectance to the light incident at an angle of 60°.

TABLE 5

| | First layer | | Second layer | | Third layer | |
| --- | --- | --- | --- | --- | --- | --- |
| No. | Refractive index | Magnification | Refractive index | Magnification | Refractive index | Magnification |
| 1 | 1.7~2.5 | 0.8~1.8 | 1.6~2.5 | 0.04~0.5 | 1.4~1.5 | 0.4~1.1 |
| 2 | 1.7~2.5 | 0.4~1.4 | 1.6~2.5 | 0.5~0.9 | 1.4~1.5 | 0.6~1.0 |
| 3 | 1.7~2.5 | 0.5~0.9 | 1.7~2.5 | 0.4~1.3 | 1.4~1.5 | 0.6~1.0 |
| 4 | 1.6~2.4 | 0.04~0.5 | 1.7~2.4 | 0.8~1.8 | 1.4~1.5 | 0.6~1.0 |

Among them, particularly preferred combinations are shown in Table 6.

TABLE 6

| | First layer | | Second layer | | Third layer | |
|---|---|---|---|---|---|---|
| No. | Refractive index | Magnification | Refractive index | Magnification | Refractive index | Magnification |
| 1 | 1.80 | 1.44 | 1.60 | 0.06 | 1.40 | 0.81 |
| 2 | 2.00 | 1.56 | 1.60 | 0.19 | 1.40 | 0.69 |
| 3 | 2.20 | 1.69 | 1.60 | 0.19 | 1.40 | 0.63 |
| 4 | 1.80 | 0.25 | 1.70 | 1.06 | 1.40 | 0.87 |
| 5 | 2.00 | 1.50 | 1.70 | 0.19 | 1.40 | 0.75 |
| 6 | 2.20 | 1.69 | 1.70 | 0.13 | 1.40 | 0.69 |
| 7 | 1.90 | 1.31 | 1.80 | 0.25 | 1.40 | 0.81 |
| 8 | 1.90 | 0.87 | 1.80 | 0.63 | 1.40 | 0.81 |
| 9 | 2.10 | 1.31 | 1.80 | 0.38 | 1.40 | 0.69 |
| 10 | 1.80 | 1.13 | 2.00 | 0.31 | 1.40 | 0.94 |
| 11 | 2.10 | 1.00 | 2.00 | 0.63 | 1.40 | 0.75 |
| 12 | 2.30 | 0.19 | 2.00 | 1.31 | 1.40 | 0.81 |
| 13 | 1.90 | 1.38 | 2.20 | 0.06 | 1.40 | 0.87 |
| 14 | 2.10 | 1.25 | 2.20 | 0.50 | 1.40 | 0.81 |
| 15 | 2.30 | 0.63 | 2.20 | 1.06 | 1.40 | 0.75 |
| 16 | 1.80 | 1.25 | 2.40 | 0.13 | 1.40 | 1.00 |
| 17 | 2.00 | 1.31 | 2.40 | 0.13 | 1.40 | 0.94 |
| 18 | 1.90 | 1.44 | 1.60 | 0.13 | 1.44 | 0.75 |
| 19 | 2.10 | 1.56 | 1.60 | 0.06 | 1.44 | 0.75 |
| 20 | 2.00 | 1.44 | 1.70 | 0.13 | 1.44 | 0.75 |
| 21 | 2.20 | 1.63 | 1.70 | 0.06 | 1.44 | 0.75 |
| 22 | 1.90 | 1.38 | 1.80 | 0.13 | 1.44 | 0.81 |
| 23 | 2.10 | 1.50 | 1.80 | 0.13 | 1.44 | 0.75 |
| 24 | 1.80 | 0.75 | 1.90 | 0.75 | 1.44 | 0.87 |
| 25 | 1.80 | 0.06 | 1.90 | 1.44 | 1.44 | 0.81 |
| 26 | 2.00 | 1.38 | 1.90 | 0.13 | 1.44 | 0.81 |
| 27 | 1.90 | 1.00 | 2.00 | 0.44 | 1.44 | 0.87 |
| 28 | 1.90 | 0.56 | 2.00 | 1.00 | 1.44 | 0.87 |
| 29 | 2.10 | 0.19 | 2.00 | 1.31 | 1.44 | 0.81 |
| 30 | 2.10 | 1.38 | 2.00 | 0.13 | 1.44 | 0.81 |
| 31 | 2.20 | 1.38 | 2.00 | 0.31 | 1.44 | 0.69 |
| 32 | 1.90 | 1.25 | 2.10 | 0.19 | 1.44 | 0.87 |
| 33 | 2.00 | 0.13 | 2.10 | 1.50 | 1.44 | 0.81 |
| 34 | 2.20 | 1.06 | 2.10 | 0.56 | 1.44 | 0.75 |
| 35 | 1.80 | 1.13 | 2.20 | 0.19 | 1.44 | 0.94 |
| 36 | 2.00 | 0.06 | 2.20 | 1.56 | 1.44 | 0.81 |
| 37 | 2.10 | 1.25 | 2.20 | 0.31 | 1.44 | 0.81 |
| 38 | 2.30 | 1.06 | 2.20 | 0.63 | 1.44 | 0.69 |
| 39 | 1.80 | 0.06 | 2.30 | 1.69 | 1.44 | 0.75 |
| 40 | 1.90 | 1.31 | 2.30 | 0.13 | 1.44 | 0.87 |
| 41 | 1.90 | 1.13 | 2.30 | 0.25 | 1.44 | 0.94 |
| 42 | 2.10 | 0.19 | 2.30 | 1.56 | 1.44 | 0.75 |
| 43 | 2.10 | 1.31 | 2.30 | 0.19 | 1.44 | 0.87 |
| 44 | 2.20 | 1.31 | 2.30 | 0.31 | 1.44 | 0.81 |
| 45 | 1.90 | 1.25 | 2.40 | 0.13 | 1.44 | 0.94 |
| 46 | 2.00 | 1.19 | 2.40 | 0.19 | 1.44 | 0.94 |
| 47 | 2.10 | 1.38 | 2.40 | 0.13 | 1.44 | 0.87 |
| 48 | 2.20 | 1.50 | 2.40 | 0.13 | 1.44 | 0.81 |
| 49 | 1.90 | 1.25 | 2.50 | 0.13 | 1.44 | 0.94 |
| 50 | 2.00 | 1.31 | 2.50 | 0.13 | 1.44 | 0.87 |
| 51 | 2.20 | 1.56 | 2.50 | 0.13 | 1.44 | 0.75 |
| 52 | 2.00 | 1.50 | 1.60 | 0.06 | 1.46 | 0.75 |
| 53 | 2.00 | 1.44 | 1.70 | 0.13 | 1.46 | 0.75 |
| 54 | 2.10 | 1.50 | 1.80 | 0.13 | 1.46 | 0.75 |
| 55 | 2.00 | 1.38 | 1.90 | 0.19 | 1.46 | 0.75 |
| 56 | 2.40 | 0.06 | 1.90 | 1.38 | 1.46 | 0.81 |
| 57 | 1.90 | 0.81 | 2.00 | 0.69 | 1.46 | 0.87 |
| 58 | 1.90 | 1.19 | 2.10 | 0.25 | 1.46 | 0.87 |
| 59 | 2.00 | 0.38 | 2.10 | 1.25 | 1.46 | 0.81 |
| 60 | 2.00 | 1.00 | 2.10 | 0.50 | 1.46 | 0.87 |
| 61 | 2.20 | 1.25 | 2.10 | 0.38 | 1.46 | 0.75 |
| 62 | 1.90 | 1.13 | 2.20 | 0.31 | 1.46 | 0.94 |
| 63 | 2.00 | 1.19 | 2.20 | 0.25 | 1.46 | 0.87 |
| 64 | 2.10 | 1.31 | 2.20 | 0.19 | 1.46 | 0.81 |
| 65 | 2.10 | 0.25 | 2.20 | 1.44 | 1.46 | 0.75 |
| 66 | 1.90 | 1.19 | 2.30 | 0.19 | 1.46 | 0.94 |
| 67 | 1.90 | 1.13 | 2.30 | 0.25 | 1.46 | 0.94 |
| 68 | 2.00 | 1.31 | 2.30 | 0.13 | 1.46 | 0.87 |
| 69 | 2.00 | 1.25 | 2.30 | 0.19 | 1.46 | 0.87 |
| 70 | 2.10 | 0.06 | 2.30 | 1.63 | 1.46 | 0.75 |
| 71 | 2.10 | 1.44 | 2.30 | 0.13 | 1.46 | 0.81 |
| 72 | 2.20 | 1.38 | 2.30 | 0.19 | 1.46 | 0.81 |
| 73 | 1.90 | 1.19 | 2.40 | 0.19 | 1.46 | 0.94 |
| 74 | 2.00 | 1.31 | 2.40 | 0.13 | 1.46 | 0.87 |
| 75 | 2.00 | 1.19 | 2.40 | 0.25 | 1.46 | 0.94 |
| 76 | 2.10 | 1.44 | 2.40 | 0.13 | 1.46 | 0.81 |
| 77 | 2.20 | 1.44 | 2.40 | 0.13 | 1.46 | 0.81 |
| 78 | 1.90 | 1.25 | 2.50 | 0.13 | 1.46 | 0.94 |
| 79 | 2.00 | 1.31 | 2.50 | 0.13 | 1.46 | 0.87 |
| 80 | 2.10 | 1.50 | 2.50 | 0.06 | 1.46 | 0.81 |
| 81 | 2.10 | 1.31 | 2.50 | 0.13 | 1.46 | 0.87 |
| 82 | 2.10 | 1.31 | 2.30 | 0.19 | 1.50 | 0.81 |
| 83 | 1.85 | 1.17 | 2.40 | 0.19 | 1.46 | 0.98 |
| 84 | 1.90 | 1.25 | 2.40 | 0.13 | 1.46 | 0.94 |
| 85 | 1.90 | 1.19 | 2.40 | 0.24 | 1.46 | 0.93 |
| 86 | 1.95 | 1.25 | 2.40 | 0.24 | 1.46 | 0.92 |
| 87 | 1.95 | 1.25 | 2.40 | 0.21 | 1.46 | 0.90 |
| 88 | 1.95 | 1.01 | 2.40 | 0.41 | 1.46 | 0.88 |
| 89 | 1.95 | 1.33 | 2.40 | 0.08 | 1.46 | 0.88 |
| 90 | 2.00 | 1.26 | 2.40 | 0.27 | 1.46 | 0.90 |
| 91 | 2.10 | 0.54 | 2.20 | 1.25 | 1.40 | 0.73 |
| 92 | 1.70 | 0.56 | 1.80 | 1.00 | 1.40 | 0.87 |
| 93 | 1.90 | 0.13 | 1.70 | 1.19 | 1.40 | 0.87 |
| 94 | 2.20 | 0.13 | 1.70 | 1.13 | 1.40 | 0.87 |
| 95 | 1.70 | 0.13 | 2.10 | 1.50 | 1.46 | 0.81 |
| 96 | 1.80 | 0.44 | 2.10 | 1.31 | 1.46 | 0.81 |
| 97 | 2.40 | 0.06 | 2.10 | 1.50 | 1.46 | 0.81 |

In the fifth aspect of the present invention, in a case where the difference in refractive index between the first and the second layers is at least 0.3, the ratio (magnification) of the geometrical film thickness of either the first or second layer relative to the film thickness as an antireflection condition is preferably less than 0.5.

The substrate provided with antireflection films according to a sixth aspect of the present invention is a substrate provided with antireflection films, which comprises a transparent substrate and first, second and third antireflection film layers deposited (coated) in this order on one side of the transparent substrate, wherein the first and second layers are thin films having compositions which are different from each other, each having a refractive index of from 1.6 to 2.5, and at least one of the first and second layers having a film thickness of from 2 to 95 nm; and the third layer is a thin film having a refractive index of from 1.4 to 1.5 and a film thickness of from 44 to 138 nm.

Accordingly, the reflection color tone observed from the non-film face side of the substrate provided with antireflection films does not tend to be bluish not only in a case where the angle of incidence is great but also in a case where it is small, and the reflection color tone may be neutral if desired.

The refractive index is a refractive index at a wavelength of 550 nm. Materials of the first, second and third layers are not particularly limited so long as each layer has a refractive index within the above range. However, the first and second layers have compositions which are different from each other.

The substrate provided with antireflection films according to the sixth aspect of the present invention is provided with three antireflection film layers, wherein each of the first, second and third layers has a refractive index and a film thickness within a specific range to obtain a desired reflection color tone.

Further, in the sixth aspect of the present invention, the total film thickness (sum of the film thicknesses of the first, second and third layers) is preferably less than 250 nm. When the total film thickness is less than 250 nm, properties after heat treatment as mentioned hereinafter tend to be excellent.

In the sixth aspect of the present invention, particularly preferred combinations of the refractive indices and the film thicknesses of the first, second and third layers are shown in Table 7.

Among them, No. 1 and No. 4 in Table 7 are preferred since the film stack to achieve the object of the present invention has a wide variety, and No. 1 is particularly preferred. In No. 2 and No. 3, the difference in refractive index between the first and second layers is preferably less than 0.3 from the viewpoint of the reflection color tone and the reflectance to light incident at an angle of 60°.

TABLE 7

| No. | First layer Refractive index | First layer Geometrical film thickness (nm) | Second layer Refractive index | Second layer Geometrical film thickness (nm) | Third layer Refractive index | Third layer Geometrical film thickness (nm) |
|---|---|---|---|---|---|---|
| 1 | 1.7~2.5 | 60.0~140.0 | 1.6~2.5 | 2.3~50.0 | 1.4~1.5 | 50.0~135.0 |
| 2 | 1.7~2.5 | 30.0~110.0 | 1.6~2.5 | 25.0~95.0 | 1.4~1.5 | 70.0~125.0 |
| 3 | 1.7~2.5 | 25.0~95.0 | 1.7~2.5 | 30.0~95.0 | 1.4~1.5 | 75.0~125.0 |
| 4 | 1.6~2.4 | 2.4~50.0 | 1.7~2.4 | 60.0~140.0 | 1.4~1.5 | 75.0~120.0 |

Among them, particularly preferred combinations are shown in Table 8.

TABLE 8

| No. | First layer Refractive index | First layer Geometrical film thickness (nm) | Second layer Refractive index | Second layer Geometrical film thickness (nm) | Third layer Refractive index | Third layer Geometrical film thickness (nm) |
|---|---|---|---|---|---|---|
| 1 | 1.80 | 125.3 | 1.60 | 6.4 | 1.40 | 101.6 |
| 2 | 2.00 | 119.2 | 1.60 | 19.2 | 1.40 | 85.9 |
| 3 | 2.20 | 114.7 | 1.60 | 19.2 | 1.40 | 78.1 |
| 4 | 1.80 | 21.8 | 1.70 | 99.9 | 1.40 | 109.4 |
| 5 | 2.00 | 114.4 | 1.70 | 17.6 | 1.40 | 93.8 |
| 6 | 2.20 | 114.7 | 1.70 | 11.7 | 1.40 | 85.9 |
| 7 | 1.90 | 106.7 | 1.80 | 21.8 | 1.40 | 101.6 |
| 8 | 1.90 | 71.1 | 1.80 | 54.5 | 1.40 | 101.6 |
| 9 | 2.10 | 94.3 | 1.80 | 32.7 | 1.40 | 85.9 |
| 10 | 1.80 | 98.0 | 2.00 | 23.8 | 1.40 | 117.2 |
| 11 | 2.10 | 71.9 | 2.00 | 47.7 | 1.40 | 93.8 |
| 12 | 2.30 | 12.1 | 2.00 | 100.1 | 1.40 | 101.6 |
| 13 | 1.90 | 111.8 | 2.20 | 4.2 | 1.40 | 109.4 |
| 14 | 2.10 | 89.8 | 2.20 | 34.0 | 1.40 | 101.6 |
| 15 | 2.30 | 40.3 | 2.20 | 72.2 | 1.40 | 93.8 |
| 16 | 1.80 | 108.9 | 2.40 | 7.7 | 1.40 | 125.0 |
| 17 | 2.00 | 100.1 | 2.40 | 7.7 | 1.40 | 117.2 |
| 18 | 1.90 | 116.9 | 1.60 | 12.8 | 1.44 | 89.6 |
| 19 | 2.10 | 112.3 | 1.60 | 6.4 | 1.44 | 89.6 |
| 20 | 2.00 | 109.6 | 1.70 | 11.7 | 1.44 | 89.6 |
| 21 | 2.20 | 110.5 | 1.70 | 5.9 | 1.44 | 89.6 |
| 22 | 1.90 | 111.8 | 1.80 | 10.9 | 1.44 | 97.1 |
| 23 | 2.10 | 107.8 | 1.80 | 10.9 | 1.44 | 89.6 |
| 24 | 1.80 | 65.4 | 1.90 | 61.0 | 1.44 | 104.6 |
| 25 | 1.80 | 5.4 | 1.90 | 116.9 | 1.44 | 97.1 |
| 26 | 2.00 | 104.9 | 1.90 | 10.2 | 1.44 | 97.1 |
| 27 | 1.90 | 81.3 | 2.00 | 33.4 | 1.44 | 104.6 |
| 28 | 1.90 | 45.7 | 2.00 | 76.3 | 1.44 | 104.6 |
| 29 | 2.10 | 13.5 | 2.00 | 100.1 | 1.44 | 97.1 |
| 30 | 2.10 | 98.8 | 2.00 | 9.5 | 1.44 | 97.1 |
| 31 | 2.20 | 93.5 | 2.00 | 23.8 | 1.44 | 82.2 |
| 32 | 1.90 | 101.6 | 2.10 | 13.5 | 1.44 | 104.6 |
| 33 | 2.00 | 9.5 | 2.10 | 107.8 | 1.44 | 97.1 |
| 34 | 2.20 | 72.2 | 2.10 | 40.4 | 1.44 | 89.6 |
| 35 | 1.80 | 98.0 | 2.20 | 12.7 | 1.44 | 112.0 |
| 36 | 2.00 | 4.8 | 2.20 | 106.2 | 1.44 | 97.1 |
| 37 | 2.10 | 89.8 | 2.20 | 21.2 | 1.44 | 97.1 |
| 38 | 2.30 | 68.6 | 2.20 | 42.5 | 1.44 | 82.2 |
| 39 | 1.80 | 5.4 | 2.30 | 108.9 | 1.44 | 89.6 |
| 40 | 1.90 | 106.7 | 2.30 | 8.1 | 1.44 | 104.6 |
| 41 | 1.90 | 91.5 | 2.30 | 16.1 | 1.44 | 112.0 |
| 42 | 2.10 | 13.5 | 2.30 | 100.8 | 1.44 | 89.6 |
| 43 | 2.10 | 94.3 | 2.30 | 12.1 | 1.44 | 104.6 |
| 44 | 2.20 | 89.2 | 2.30 | 20.2 | 1.44 | 97.1 |
| 45 | 1.90 | 101.6 | 2.40 | 7.7 | 1.44 | 112.0 |
| 46 | 2.00 | 90.6 | 2.40 | 11.5 | 1.44 | 112.0 |
| 47 | 2.10 | 98.8 | 2.40 | 7.7 | 1.44 | 104.6 |
| 48 | 2.20 | 102.0 | 2.40 | 7.7 | 1.44 | 97.1 |
| 49 | 1.90 | 101.6 | 2.50 | 7.3 | 1.44 | 112.0 |
| 50 | 2.00 | 100.1 | 2.50 | 7.3 | 1.44 | 104.6 |
| 51 | 2.20 | 106.2 | 2.50 | 7.3 | 1.44 | 89.6 |
| 52 | 2.00 | 114.4 | 1.60 | 6.4 | 1.46 | 87.7 |
| 53 | 2.00 | 109.6 | 1.70 | 11.7 | 1.46 | 87.7 |
| 54 | 2.10 | 107.8 | 1.80 | 10.9 | 1.46 | 87.7 |
| 55 | 2.00 | 104.9 | 1.90 | 15.2 | 1.46 | 87.7 |
| 56 | 2.40 | 3.8 | 1.90 | 111.8 | 1.46 | 95.0 |
| 57 | 1.90 | 66.1 | 2.00 | 52.4 | 1.46 | 102.4 |
| 58 | 1.90 | 96.6 | 2.10 | 18.0 | 1.46 | 102.4 |
| 59 | 2.00 | 28.6 | 2.10 | 89.8 | 1.46 | 95.0 |
| 60 | 2.00 | 76.3 | 2.10 | 35.9 | 1.46 | 102.4 |
| 61 | 2.20 | 85.0 | 2.10 | 27.0 | 1.46 | 87.7 |
| 62 | 1.90 | 91.5 | 2.20 | 21.2 | 1.46 | 109.7 |
| 63 | 2.00 | 90.6 | 2.20 | 17.0 | 1.46 | 102.4 |
| 64 | 2.10 | 94.3 | 2.20 | 12.7 | 1.46 | 95.0 |
| 65 | 2.10 | 18.0 | 2.20 | 97.7 | 1.46 | 87.7 |
| 66 | 1.90 | 96.6 | 2.30 | 12.1 | 1.46 | 109.7 |
| 67 | 1.90 | 91.5 | 2.30 | 16.1 | 1.46 | 109.7 |
| 68 | 2.00 | 100.1 | 2.30 | 8.1 | 1.46 | 102.4 |
| 69 | 2.00 | 95.3 | 2.30 | 12.1 | 1.46 | 102.4 |

TABLE 8-continued

| | First layer | | Second layer | | Third layer | |
|---|---|---|---|---|---|---|
| No. | Refractive index | Geometrical film thickness (nm) | Refractive index | Geometrical film thickness (nm) | Refractive index | Geometrical film thickness (nm) |
| 70 | 2.10 | 4.5 | 2.30 | 104.9 | 1.46 | 87.7 |
| 71 | 2.10 | 103.3 | 2.30 | 8.1 | 1.46 | 95.0 |
| 72 | 2.20 | 93.5 | 2.30 | 12.1 | 1.46 | 95.0 |
| 73 | 1.90 | 96.6 | 2.40 | 11.5 | 1.46 | 109.7 |
| 74 | 2.00 | 100.1 | 2.40 | 7.7 | 1.46 | 102.4 |
| 75 | 2.00 | 90.6 | 2.40 | 15.4 | 1.46 | 109.7 |
| 76 | 2.10 | 103.3 | 2.40 | 7.7 | 1.46 | 95.0 |
| 77 | 2.20 | 97.7 | 2.40 | 7.7 | 1.46 | 95.0 |
| 78 | 1.90 | 101.6 | 2.50 | 7.3 | 1.46 | 109.7 |
| 79 | 2.00 | 100.1 | 2.50 | 7.3 | 1.46 | 102.4 |
| 80 | 2.10 | 107.8 | 2.50 | 3.7 | 1.46 | 95.0 |
| 81 | 2.10 | 94.3 | 2.50 | 7.3 | 1.46 | 102.4 |
| 82 | 2.10 | 94.3 | 2.30 | 12.1 | 1.50 | 91.2 |
| 83 | 1.85 | 98.0 | 2.40 | 11.5 | 1.46 | 115.0 |
| 84 | 1.90 | 101.6 | 2.40 | 7.7 | 1.46 | 109.7 |
| 85 | 1.90 | 97.0 | 2.40 | 15.0 | 1.46 | 109.1 |
| 86 | 1.95 | 98.2 | 2.40 | 15.0 | 1.46 | 107.2 |
| 87 | 1.95 | 98.1 | 2.40 | 12.7 | 1.46 | 105.0 |
| 88 | 1.95 | 80.0 | 2.40 | 25.0 | 1.46 | 103.0 |
| 89 | 1.95 | 105.0 | 2.40 | 5.0 | 1.46 | 103.0 |
| 90 | 2.00 | 96.4 | 2.40 | 16.8 | 1.46 | 105.6 |
| 91 | 2.10 | 38.6 | 2.20 | 85.0 | 1.40 | 93.8 |
| 92 | 1.70 | 52.9 | 1.80 | 87.1 | 1.40 | 109.4 |
| 93 | 1.90 | 10.2 | 1.70 | 111.6 | 1.40 | 109.4 |
| 94 | 2.20 | 8.5 | 1.70 | 105.7 | 1.40 | 109.4 |
| 95 | 1.70 | 11.7 | 2.10 | 107.8 | 1.46 | 95.0 |
| 96 | 1.80 | 38.1 | 2.10 | 94.3 | 1.46 | 95.0 |
| 97 | 2.40 | 3.8 | 2.10 | 107.8 | 1.46 | 95.0 |

With respect to the substrate provided with antireflection films according to the first aspect of the present invention in a case where the number of antireflection film layers is three and the substrates provided with antireflection films according to the fifth and sixth aspects of the present invention, the materials of the antireflection films are not particularly limited. However, the first and second layers are preferably thin films having compositions which are different from each other, each containing an oxide, an oxynitride or an oxycarbide of at least one element selected from the group consisting of titanium, silicon, zinc, aluminum, tin, zirconium, tantalum, tungsten, bismuth and niobium, or a nitride or a nitrogen carbide of at least one element selected from the group consisting of silicon, aluminum and boron, and the third layer is preferably a thin layer containing an oxide of silicon from the viewpoint of the refractive index. In the fifth and sixth aspects of the present invention, the type of the compound contained, and composition and content of the compound of the first and second layers are never exactly the same, but the two layers may contain the same type of compound and have different compositions of the compound, or may contain the same type of compound and have the same composition of the compound and have different contents of the compound.

By using such materials, not only the transmittance is high, but also it tends to be easy to satisfy the conditions in each of the first, fifth and sixth aspects of the present invention.

Particularly, each of the first and second layers is preferably a thin film consisting of any one of (1) oxynitride of tin, (2) mixed oxide of zinc and tin, (3) a mixed oxide of titanium and silicon, (4) oxycarbide of silicon, (5) oxynitride of silicon, (6) oxynitride of aluminum, (7) nitride of aluminum, (8) oxide of titanium, (9) oxide of tantalum and (10) oxide of niobium, since optical properties do not substantially change even after a heat treatment, and mechanical properties after the heat treatment are good. Further, the third layer is preferably a thin film consisting of any one of (1) oxide of silicon, (2) mixed oxide of silicon and aluminum and (3) oxynitride of silicon from the same reasons as mentioned above. Particularly, each of the first and second layers preferably consists of oxynitride of tin or oxide of titanium from the viewpoint of heat resistance during heat treatment as mentioned hereinafter.

The substrate provided with antireflection films according to a seventh aspect of the present invention is a substrate provided with antireflection films, which comprises a transparent substrate and first, second and third antireflection film layers deposited (coated) in this order on one side of the transparent substrate, wherein the first layer is a tin oxynitride film having a film thickness of from 70 to 130 nm, the second layer is a titanium oxide film having a film thickness of from 1 to 25 nm, and the third layer is a silicon oxide film having a film thickness of from 80 to 130 nm.

Further, the substrate provided with antireflection films according to an eighth aspect of the present invention is a substrate provided with antireflection films, which comprises a transparent substrate and first, second and third antireflection film layers deposited (coated) in this order on one side of the transparent substrate, wherein the first layer is a titanium oxide film having a film thickness of from 1 to 25 nm, the second layer is a tin oxynitride film having a film thickness of from 70 to 130 nm, and the third layer is a silicon oxide film having a film thickness of from 80 to 130 nm.

Accordingly, the reflection color tone observed from the non-film face side of the substrate provided with antireflection films does not tend to be bluish not only in a case where the angle of incidence is great but also in a case where it is small, and the reflection color tone may be neutral if desired.

Further, by the above film stack, the change in volume of the film tends to be small even if a heat treatment is carried out, no cracks or peeling tends to be formed, and optical properties tend to be maintained.

Here, in the seventh and eighth aspects of the present invention, each layer may contain another element as an impurity similarly to the fourth aspect of the present invention.

In the seventh aspect of the present invention, the first layer has a film thickness of preferably from 80 to 120 nm. The second layer has a film thickness of preferably from 1 to 20 nm. The third layer has a film thickness of preferably from 90 to 120 nm.

In the eighth aspect of the present invention, the first layer has a film thickness of preferably from 1 to 20 nm, the second layer has a film thickness of preferably from 80 to 120 nm, and the third layer has a film thickness of preferably from 90 to 120 nm.

In the seventh and eighth aspects of the present invention, the total thickness (sum of the thicknesses of the first, second and third layers) is preferably less than 250 nm. When the total film thickness is less than 250 nm, the properties after heat treatment as mentioned hereinafter tend to be excellent.

The content of nitrogen in the tin oxynitride film to be used in the present invention preferably exceeds 0 at % and is less than 4.0 at % (particularly preferably it exceeds 0 at % and is less than 0.9 at %) from the viewpoint of heat resistance. The content of nitrogen in the tin oxynitride film after heat treatment preferably exceeds 0 at % and is less than 4.0 at % (particularly preferably it exceeds 0 at % and is less than 0.9 at %).

The content of nitrogen in the tin oxynitride film is measured by using a XPS measuring apparatus (Quantum 2000 manufactured by PHI). The X-ray source and the charge calibration are as follows:

X-ray source: AlK α ray monochromatized by quartz crystal, beam diameter: 100 μm, output: 15 kV, 20 W Charge calibration: electron shower: 30 eV, $Ar^+$ ion shower: 6 eV The measuring method is specifically as follows. The content of nitrogen in the tin oxynitride film is also measured in the same manner.

Using $Ar^+$ ion bean (1 keV, 6.25 mA/cm$^2$), raster scanning is carried out in an area of 2 mm×2 mm on a sample face, to measure the face subjected to spattering etching of the surface layer (angle of detection of photoelectron is 45°, and the width of the path energy of the photoelectron analyzer is 117.4 eV).

Peaks of $N_{1s}$, $O_{1s}$ and $Sn_{3d5/2}$ are measured to obtain a peak area, and the ratio of number of atoms on the surface is calculated by using relative sensitivity coefficients to obtain the content (at %) of nitrogen. The relative sensitivity coefficients are 0.499 with respect to $N_{1s}$, 0.733 with respect to $O_{1s}$ and 4.890 with respect to $Sn_{3d5/2}$, respectively.

In the present invention, in a case where the substrate provided with antireflection films of the first aspect of the present invention has two antireflection film layers, it preferably corresponds to at least one of the second, third and fourth aspects simultaneously. Particularly preferred is a substrate provided with antireflection films which corresponds to all of the first, second, third and fourth aspects.

Further, in a case where the substrate provided with antireflection films of the first aspect of the present invention has three antireflection film layers, it preferably corresponds to at least one of the fifth, sixth, seventh and eighth aspects of the present invention simultaneously. Particularly preferred is a substrate provided with antireflection films which corresponds to all of the first, fifth, sixth and seventh aspects, or a substrate provided with antireflection films which corresponds to all of the first, fifth, sixth and eighth aspects of the present invention.

With respect to the substrates provided with antireflection films according to the first to eighth aspects of the present invention, each layer has an extinction coefficient of preferably at most 0.05 at the visible light region.

Here, the extinction coefficient is generally obtained from the following formula:

$$k=(\alpha \times \lambda_0)/4\pi$$

wherein k is an extinction coefficient, $\lambda_0$ is a wavelength of incident light in vacuum, and α is an absorption coefficient.

When each layer has an extinction coefficient of at most 0.05, the transmittance (Tv) of visible light incident at an angle of incidence of 0° to the substrate provided with antireflection films using a substrate (particularly a glass substrate) having a visible light transmittance (Tv) of at least 70% can be made to be at least 70%. By selecting a film stack of the antireflection films and using a substrate having a Tv of at least 73%, a substrate provided with antireflection films having a Tv of at least 75% can be obtained, and the transmittance of a windshield for an automobile regulated in each country can be satisfied even when a heat absorbing glass to shield the direct solar radiation light is used as a substrate.

The extinction coefficient of each layer at the visible light region is more preferably at most 0.01.

According to a ninth aspect of the present invention, there is provided a method for producing a substrate provided with antireflection films, which comprises subjecting the substrate provided with antireflection films as defined in any one of the first to eighth aspects of the present invention to a heat treatment to produce the substrate provided with antireflection films having bending or tempering applied thereto.

According to the ninth aspect of the present invention, bending or tempering may be carried out by a heat treatment, and accordingly it is not necessary to form antireflection films after bending or tempering, such being favorable in view of production steps.

Accordingly, the substrates provided with antireflection films according to the first to eighth aspects of the present invention are preferably substrates provided with antireflection films which may undergo bending or tempering by a heat treatment.

Bending is a process carried out during or immediately after the heat treatment to deform a planar substrate provided with antireflection films into a three-dimensional curved shape in such a manner that the antireflection film face side faces the interior side, when the substrate provided with antireflection films of the present invention is used for e.g. a windshield of an automobile for example.

Tempering is a process to apply a compression stress layer on a glass surface by quenching a substrate immediately after a planar substrate provided with antireflection films is subjected to heat treatment so that the antireflection film face side faces the interior side, when the substrate provided with antireflection films of the present invention is used for e.g. a rear glass or a door glass of an automobile.

In bending and tempering, the temperature during the heat treatment is from 560 to 700° C., and the heat treatment is carried out in the air atmosphere. The heat treatment is carried out for from about 3 to about 10 minutes.

A glass provided with conventional at least three antireflection film layers has a total thickness of more than about 250 nm and is so thick, whereby cracks are likely to form on the films by the heat treatment, and no bending nor tempering can be carried out. Further, with respect to a glass provided with two film layers wherein one or both of the two layers is a tin oxide film, optical properties tend to be impaired due to the heat treatment, and cracks or peeling is likely to form, and accordingly no bending nor tempering can be carried out.

On the contrary, with respect to the substrate provided with antireflection films of the present invention, materials of which the optical properties and the volume are less likely to change due to the heat treatment are used, and the total film thickness can be made to be less than 250 nm as the case requires, and accordingly bending or tempering can be carried out by a heat treatment.

The method for forming the substrate provided with antireflection films of the present invention is not particularly limited, but preferred is to form antireflection films on the substrate by a sputtering method. The sputtering method may be a DC (direct current) sputtering method or AC (alternating current) sputtering method. Preferred is a DC sputtering method, particularly preferred is a magnetron DC sputtering method, since the process can be stably carried out, and it is easy to form films in a large area.

As the sputtering method, reactive sputtering may also be carried out by using a reactive gas.

Here, in a case of forming an insulating film (such as a silica film) from an electrically conductive target, preferred is AC sputtering method since no significant arcing tends to take place and film formation can be carried out stably.

As a method for producing the substrate provided with antireflection films wherein the transparent substrate to be used in the present invention is a laminate, antireflection films may be formed on a first transparent substrate, which is then laminated on a second transparent substrate by means of an intermediate film, or a first transparent substrate and a second transparent substrate may be laminated by means of an intermediate film, and then antireflection films may be formed.

When the substrate provided with antireflection films of the present invention is one to which bending by a heat treatment can be applied, antireflection films may be formed on a first transparent substrate, which is processed to have a three-dimensional curved shape by a heat treatment and further laminated on a second transparent substrate by means of an intermediate film. For example, the substrate provided with antireflection films of the present invention wherein the transparent substrate is glass, is subjected to bending to have a three-dimensional curved shape by a heat treatment, and then the glass substrate provided with antireflection films subjected to bending and another glass substrate having approximately the same shape are laminated by means of an intermediate film to produce a laminated glass provided with antireflection films. This method for producing a laminated glass is a tenth aspect of the present invention.

Here, it is preferred to dispose the second transparent substrate on the non-film face side of the first transparent substrate so that they are not in contact with each other during bending and they are simultaneously subjected to bending to have a three-dimensional curved shape, and then the second transparent substrate is laminated on the first transparent substrate.

Application of the substrate provided with antireflection films of the present invention is not particularly limited, and it is suitably used as a window of a transport (such as a window of a vehicle) or a covering for a meter equipment for example. It is particularly suitable for a window glass (particularly a windshield or a rear glass) of an automobile.

Now, the present invention will be described in further detail with reference to Examples. However, it should be understood that the present invention is by no means restricted to such specific Examples.

1. Production of Substrate Provided with Antireflection Films

EXAMPLE 1

In a vacuum chamber, metal Sn, metal Ti and metal Si (B-doped polycrystal) were set as sputtering targets on cathodes, and the vacuum chamber was evacuated to $1.3 \times 10^{-3}$ Pa. Using a heat absorbing glass ("SUNGREEN" having a thickness of 2 mm, manufactured by Asahi Glass Company, Limited, hereinafter referred to as "VFL2") as a glass substrate 1 set in the vacuum chamber, and antireflection films were formed thereon as follows.

First Layer

As a discharge gas, a mixed gas of 250 sccm of oxygen and 350 sccm of nitrogen was introduced. Here, the pressure was 0.45 Pa. Then, by reactive DC sputtering of Sn, a tin oxynitride film having a film thickness of 98 nm (a refractive index of 1.95 at a wavelength of 550 nm and a nitrogen content of 0.5 at %) was formed as a first film layer 2.

Second Layer

Then, as a discharge gas, a mixed gas of 300 sccm of argon and 60 sccm of oxygen was introduced. Here, the pressure was 0.4 Pa. Then, by reactive DC sputtering of Ti, a titanium oxide film having a film thickness of 13 nm (a refractive index of 2.4 at a wavelength of 550 nm) was formed as a second film layer 3.

Third layer

Then, as a discharge gas, a mixed gas of 100 sccm of argon and 500 sccm of oxygen was introduced. Here, the pressure was 0.35 Pa. Then, by reactive DC sputtering of Si, a silicon oxide film having a film thickness of 105 nm (a refractive index of 1.46 at a wavelength of 550 nm) was formed as a third film layer 4.

Figure 2:
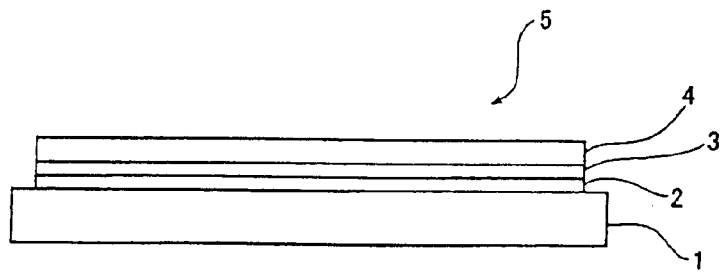
FIG. 2 is a cross-sectional schematic view illustrating one example of the substrate provided with antireflection films of the present invention.

A cross-sectional schematic view illustrating the glass provided with antireflection films thus obtained (the substrate provided with antireflection films of the present invention) is shown in FIG. 2.

EXAMPLE 2

Using the glass provided with antireflection films obtained in Example 1, bending was carried out as follows.

Using the glass 5 provided with antireflection films obtained in Example 1 and a heat absorbing glass (VFL2) as another glass substrate 6 having the same size as the above glass, the glass 5 provided with antireflection films was overlaid on said another glass substrate 6 so that the antireflection film face side of the glass 5 provided with antireflection films faced upward (outside).

A powder for preventing heat seal was inserted between the two glasses.

The two glasses were put on a mold for forming, and heat treatment was carried out in an electric heating furnace for bending. The heat treatment was carried out in the air atmosphere under such conditions that the preheating time was 3 minutes, the maximum temperature holding time was 5 minutes, the maximum achievable temperature of the glass was 620° C., and the annealing time was 3 minutes.

No change in appearance such as wrinkles, peeling or change in color was shown on the antireflection films after bending, and no extraordinary warp of the glass plate was shown. The two glasses fitted in the mold well, and were subjected to bending. The nitrogen content in the tin oxynitride film after the heat treatment was 0.3 at %.

Figure 3:
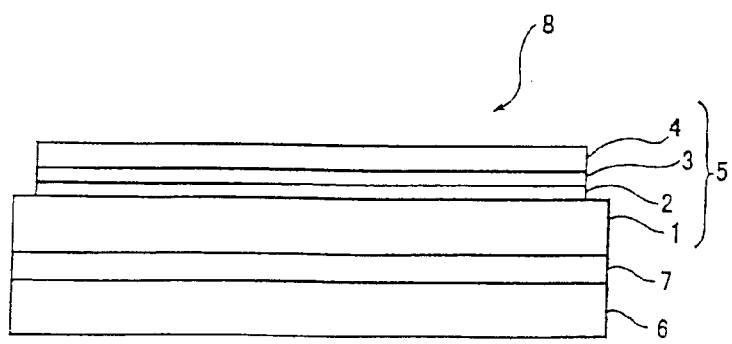
FIG. 3 is a cross-sectional schematic view illustrating one example of the laminated glass which uses the substrate provided with antireflection films of the present invention.

Then, the two glasses subjected to bending were laminated by means of an intermediate film 7 made of polyvinyl butyral (PVB) to form a laminated glass. Preparation of a laminated glass was carried out by deaerating by heating under vacuum using a rubber sack as a pre-contact bonding step and by an autoclave method (maximum temperature: 135° C., pressure: 1.3 MPa) as a main contact bonding. A cross-sectional schematic view illustrating the laminated glass 8 thus obtained is shown in FIG. 3.

After lamination, no change in appearance such as wrinkles, peeling or change in color was shown on the antireflection films, and no extraordinary warp of the glass plate was shown.

EXAMPLE 3

Three antireflection film layers were formed in the same manner as in Example 1 except that a highly heat absorbing glass (UV COOLGREEN having a thickness of 2 mm, manufactured by Asahi Glass Company, Limited, hereinafter referred to as "UVFL2") was used instead of the glass substrate in Example 1. Using the obtained glass provided with antireflection films and a highly heat absorbing glass (UVFL2) having the same size as said glass, a laminated glass was prepared in the same manner as in Example 2.

After bending and lamination, no change in appearance such as wrinkles, peeling or change in color was shown on the antireflection films, and no extraordinary warp of the glass plate was shown.

EXAMPLE 4

In a vacuum chamber, metal ZnSn (Sn content: 10 at %), metal Ti and metal Si (B-doped polycrystal) were set as sputtering targets on cathodes, and the vacuum chamber was evacuated to $1.3 \times 10^{-3}$ Pa. Using a heat absorbing glass (VFL2) as a glass substrate set in the vacuum chamber, antireflection films were formed thereon as follows.

First Layer

As a discharge gas, a mixed gas of 100 sccm of argon and 500 sccm of oxygen was introduced. Here, the pressure was 0.35 Pa. Then, by reactive DC sputtering of ZnSn, a mixed oxide film of Zn and Sn having a film thickness of 105 nm (a refractive index of 1.95 at a wavelength of 550 nm) was formed.

Second Layer

Then, as a discharge gas, a mixed gas of 300 sccm of argon and 60 sccm of oxygen was introduced. Here, the pressure was 0.4 Pa. Then, by reactive DC sputtering of Ti, a titanium oxide film having a film thickness of 5 nm (a refractive index of 2.4 at a wavelength of 550 nm) was formed.

Third Layer

Then, as a discharge gas, a mixed gas of 100 sccm of argon and 500 sccm of oxygen was introduced. Here, the pressure was 0.35 Pa. Then, by reactive DC sputtering of Si, a silicon oxide film having a film thickness of 103 nm (a refractive index of 1.46 at a wavelength of 550 nm) was formed.

The glass provided with antireflection films thus obtained was subjected to bending and lamination in the same manner as in Example 2. As another glass substrate 6 to form a laminated glass, a heat absorbing glass (VFL2) having the same size as said glass was used.

After bending and lamination, no change in appearance such as wrinkles, peeling or change in color was shown on the antireflection films, and no extraordinary warp of the glass plate was shown.

EXAMPLE 5

In a vacuum chamber, metal TiSi (Si content: 48 at %), metal Ti and metal Si (B-doped polycrystal) were set as sputtering targets on cathodes, and the vacuum chamber was evacuated to $1.3 \times 10^{-3}$ Pa. Using a heat absorbing glass (VFL2) as a glass substrate set in the vacuum chamber, antireflection films were formed thereon as follows.

First Layer

As a discharge gas, a mixed gas of 100 sccm of argon and 500 sccm of oxygen was introduced. Here, the pressure was 0.35 Pa. Then, by reactive DC sputtering of TiSi, a mixed oxide film of Ti and Si having a film thickness of 80 nm (a refractive index of 1.95 at a wavelength of 550 nm) was formed.

Second Layer

Then, as a discharge gas, a mixed gas of 300 sccm of argon and 60 sccm of oxygen was introduced. Here, the pressure was 0.4 Pa. Then, by reactive DC sputtering of Ti, a titanium oxide film having a film thickness of 25 nm (a refractive index of 2.4 at a wavelength of 550 nm) was formed.

Third Layer

Then, as a discharge gas, a mixed gas of 100 sccm of argon and 500 sccm of oxygen was introduced. Here, the pressure was 0.35 Pa. Then, by reactive DC sputtering of Si, a silicon oxide film having a film thickness of 103 nm (a refractive index of 1.46 at a wavelength of 550 nm) was formed.

The glass provided with antireflection films thus obtained was subjected to bending and lamination in the same manner as in Example 2. As another glass substrate 6 to form a laminated glass, a heat absorbing glass (VFL2) having the same size as said glass was used.

After bending and lamination, no change in appearance such as wrinkles, peeling or change in color was shown on the antireflection films, and no extraordinary warp of the glass plate was shown.

EXAMPLE 6

In a vacuum chamber, metal Ti, metal TiSi (Si content: 48 at %) and metal Si (B-doped polycrystal) were set as sputtering targets on cathodes, and the vacuum chamber was evacuated to $1.3 \times 10^{-3}$ Pa. Using a highly heat absorbing glass (UVFL2) as a glass substrate set in the vacuum chamber, antireflection films were formed thereon as follows.

First Layer

As a discharge gas, a mixed gas of 300 sccm of argon and 60 sccm of oxygen was introduced. Here, the pressure was 0.4 Pa. Then, by reactive DC sputtering of Ti, a titanium oxide film having a film thickness of 4 nm (a refractive index of 2.4 at a wavelength of 550 nm) was formed.

Second Layer

Then, as a discharge gas, a mixed gas of 100 sccm of argon and 500 sccm of oxygen was introduced. Here, the pressure was 0.35 Pa. Then, by reactive DC sputtering of TiSi, a mixed oxide film of Ti and Si having a film thickness of 107 nm (a refractive index of 1.95 at a wavelength of 550 nm) was formed.

Third Layer

Then, as a discharge gas, a mixed gas of 100 sccm of argon and 500 sccm of oxygen was introduced. Here, the pressure was 0.35 Pa. Then, by reactive DC sputtering of Si, a silicon oxide film having a film thickness of 93 nm (a refractive index of 1.46 at a wavelength of 550 nm) was formed.

The glass provided with antireflection films thus obtained was subjected to bending and lamination in the same manner as in Example 2. As another glass substrate 6 to form a laminated glass, a highly heat absorbing glass (UVFL2) having the same size as said glass was used.

After bending and lamination, no change in appearance such as wrinkles, peeling or change in color was shown on the antireflection films, and no extraordinary warp of the glass plate was shown.

Further, a glass provided with antireflection films was prepared in the same manner as in Example 6 except that the second layer in Example 6 was changed to a tin oxynitride film of 107 nm, and bending and lamination were carried out. The conditions for forming the tin oxynitride film were the same as in Example 1. The obtained glass provided with antireflection films and the laminated glass after bending and lamination were evaluated, and as good results as in Example 6 were obtained.

EXAMPLE 7

In a vacuum chamber, metal Sn and metal Si (B-doped polycrystal) were set as sputtering targets on cathodes, and the vacuum chamber was evacuated to $1.3 \times 10^{-3}$ Pa. Using a transparent plate glass ("float plate glass" having a thickness of 2 mm, manufactured by Asahi Glass Company, Limited, hereinafter referred to as "FL2") as a glass substrate 11 set in the vacuum chamber, antireflection films were formed thereon as follows.

First Layer

As a discharge gas, a mixed gas of 250 sccm of oxygen and 350 sccm of nitrogen was introduced. Here, the pressure was 0.45 Pa. Then, by reactive DC sputtering of Sn, a tin oxynitride film having a film thickness of 114 nm (a refractive index of 1.95 at a wavelength of 550 nm and a nitrogen content of 0.5 at %) was formed as a first film layer 12.

Second Layer

Then, as a discharge gas, a mixed gas of 100 sccm of argon and 500 sccm of oxygen was introduced. Here, the pressure was 0.35 Pa. Then, by reactive DC sputtering of Si, a silicon oxide film having a film thickness of 95 nm (a refractive index of 1.46 at a wavelength of 550 nm) was formed as a second film layer 13.

Figure 4:
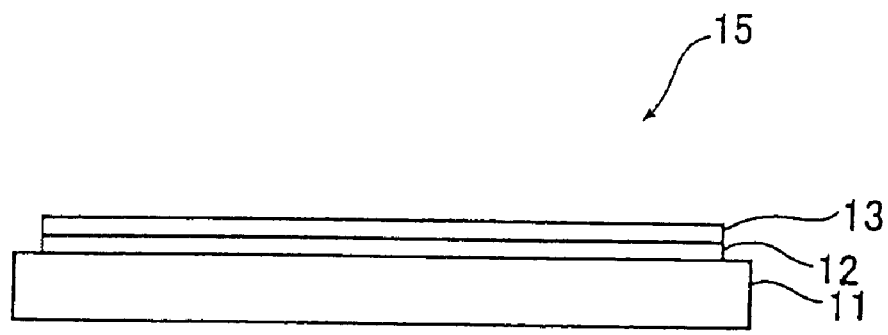
FIG. 4 is a cross-sectional schematic view illustrating one example of the substrate provided with antireflection films of the present invention.

A cross-sectional schematic view illustrating the glass provided with antireflection films thus obtained is shown in FIG. 4.

The glass provided with antireflection films obtained in Example 7 was subjected to bending and lamination in the same manner as in Example 2. As another glass substrate 16 to form a laminated glass, a transparent plate glass (FL2) was used as another glass substrate 16 having the same size as said glass, and a laminated glass was prepared by means of an intermediate film 17 made of PVB.

Figure 5:
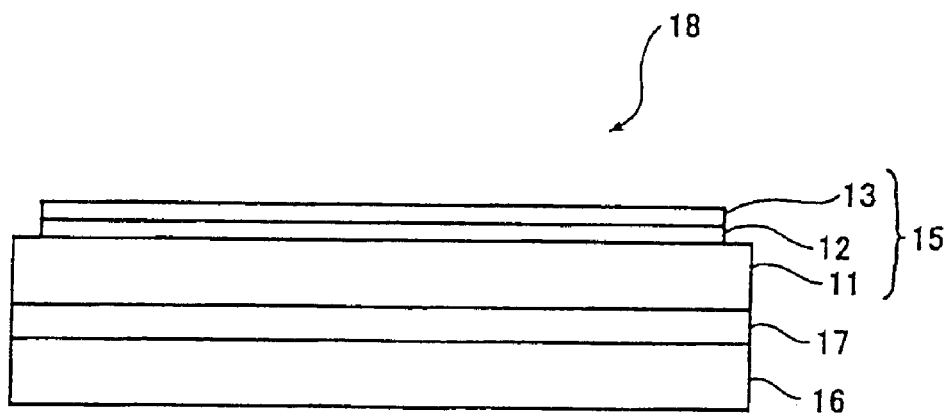
FIG. 5 is a cross-sectional schematic view illustrating one example of a laminated glass which uses the substrate provided with antireflection films of the present invention.

A cross-sectional schematic view illustrating the laminated glass 18 thus obtained is shown in FIG. 5.

After bending and lamination, no change in appearance such as wrinkles, peeling or change in color was shown on the antireflection films, and no extraordinary warp of the glass plate was shown. The nitrogen content in the tin oxynitride film after the heat treatment was 0.3 at %.

EXAMPLE 8

Two antireflection film layers were prepared in the same manner as in Example 7 except that the glass substrate in Example 7 was changed to a heat absorbing glass (VFL2). Using the obtained glass provided with antireflection films and a heat absorbing glass (VFL2) having the same size as said glass, a laminated glass was obtained in a same manner as in Example 7.

After bending and lamination, no change in appearance such as wrinkles, peeling or change in color was shown on the antireflection films, and no extraordinary warp of the glass plate was shown.

EXAMPLE 9

Two antireflection film layers were prepared in the same manner as in Example 7 except that the glass substrate in Example 7 was changed to a highly heat absorbing glass (UVFL2). Using the obtained glass provided with antireflection films and a highly heat absorbing glass (UVFL2) having the same size as said glass, a laminated glass was obtained in a same manner as in Example 7.

After bending and lamination, no change in appearance such as wrinkles, peeling or change in color was shown on the antireflection films, and no extraordinary warp of the glass plate was shown.

EXAMPLE 10

In a vacuum chamber, a Zr—Si target (Si content: 53 at %) and metal Si (B-doped polycrystal) were set as sputtering targets on cathodes, and the vacuum chamber was evacuated to $1.3 \times 10^{-3}$ Pa. Using a heat absorbing glass (VFL2) as a glass substrate set in the vacuum chamber, antireflection films were formed thereon as follows.

First Layer

As a discharge gas, a mixed gas of 200 sccm of argon and 100 sccm of oxygen was introduced. Here, the pressure was 0.35 Pa. Then, by reactive DC sputtering, a composite oxide film of Zr and Si having a film thickness of 128 nm (a refractive index of 1.80 at a wavelength of 550 nm) was formed.

Second Layer

Then, as a discharge gas, a mixed gas of 100 sccm of argon and 500 sccm of oxygen was introduced. Here, the pressure was 0.35 Pa. Then, by reactive DC sputtering of Si, a silicon oxide film having a film thickness of 95 nm (a refractive index of 1.46 at a wavelength of 550 nm) was formed.

EXAMPLE 11

In a vacuum chamber, metal Ti and metal Si (B-doped polycrystal) were set as sputtering targets on cathodes, and the vacuum chamber was evacuated to $1.3 \times 10^{-3}$ Pa. Using a highly heat absorbing glass (UVFL2) as a glass substrate set in the vacuum chamber, antireflection films were formed thereon as follows.

First Layer

As a discharge gas, a mixed gas of 300 sccm of argon and 60 sccm of oxygen was introduced. Here, the pressure was 0.4 Pa. Then, by reactive DC sputtering of Ti, a titanium oxide film having a film thickness of 106 nm (a refractive index of 2.4 at a wavelength of 550 nm) was formed.

Second Layer

Then, as a discharge gas, a mixed gas of 100 sccm of argon and 500 sccm of oxygen was introduced. Here, the pressure was 0.35 Pa. Then, by reactive DC sputtering of Si, a silicon oxide film having a film thickness of 87 nm (a refractive index of 1.46 at a wavelength of 550 nm) was formed.

The glass provided with antireflection films thus obtained was subjected to bending and lamination in the same method as in Example 7. As another glass to form a laminated glass, a highly heat absorbing glass (UVFL2) having the same size as said glass was used.

After bending and lamination, no change in appearance such as wrinkles, peeling or change in color was shown on the antireflection films, and no extraordinary warp of the glass plate was shown.

EXAMPLE 12

In a vacuum chamber, metal Sn, metal Ti and metal Si (B-doped polycrystal) were set as sputtering targets on cathodes, and the vacuum chamber was evacuated to $1.3 \times 10^{-3}$ Pa. Using a heat absorbing glass (VFL2) as a glass substrate 1 set in the vacuum chamber, antireflection films were formed thereon as follows.

First Layer

As a discharge gas, 1,000 sccm of dinitrogen oxide gas ($N_2O$ gas) was introduced. Here, the pressure was 0.9 Pa. Then, by reactive DC sputtering of Sn, a tin oxynitride film having a film thickness of 98 nm (a refractive index of 1.95 at a wavelength of 550 nm and a nitrogen content of 0.5 at %) was formed as a first film layer 2.

A tin oxynitride ($SnO_xN_y$) film having a high heat resistance can be stably obtained by film formation using $N_2O$ gas as compared with film formation using a mixed gas of oxygen and nitrogen as a discharge gas as in Example 1.

Second Layer

Then, as a discharge gas, a mixed gas of 300 sccm of argon and 60 sccm of oxygen was introduced. Here, the pressure was 0.4 Pa. Then, by reactive DC sputtering of Ti, a titanium oxide film having a film thickness of 13 nm (a refractive index of 2.4 at a wavelength of 550 nm) was formed as a second film layer 3.

Third Layer

Then, as a discharge gas, a mixed gas of 100 sccm of argon and 500 sccm of oxygen was introduced. Here, the pressure was 0.35 Pa. Then, by intermittent DC sputtering of Si target while applying to the cathode of Si a DC voltage pulsed by means of a pulsing module (manufactured by Kyosan Electric Manufacturing Co., Ltd.) from a DC power source, a silicon oxide film having a thickness of 105 nm (a refractive index of 1.46 at a wavelength of 550 nm) was formed.

The glass provided with antireflection films thus obtained was subjected to bending and lamination in the same manner as in Example 2. As another glass 6 to form a laminated glass, a heat absorbing glass (VFL2) having the same size as said glass was used. The nitrogen content in the tin oxynitride film after the heat treatment was 0.3 at %.

With respect to the obtained laminated glass, no change in appearance such as wrinkles, peeling or change in color was shown on the antireflection films, and no extraordinary warp of the glass plate was shown.

EXAMPLE 13

In the same manner as in Example 12, three antireflection film layers were formed on a heat absorbing glass (VFL2). Using the obtained glass provided with antireflection films and a highly heat absorbing glass (UVFL2) having the same size as said glass, a laminated glass was formed in the same manner as in Example 2. No change in appearance such as wrinkles, peeling or change in color was shown on the antireflection films, and no extraordinary warp of the glass plate was shown.

When formation of the silica film in each of Examples 1 to 13 was carried out by reactive AC sputtering method using a Si target (by means of e.g. "Twin Mag" manufactured by Applied Films Corp.), the film formation could be carried out more stably.

COMPARATIVE EXAMPLE 1

A laminated glass was prepared by carrying out bending and lamination in the same manner as in Example 2 except that a heat absorbing glass (VFL2) was used instead of the glass provided with antireflection films obtained in Example 1.

COMPARATIVE EXAMPLE 2

In a vacuum chamber, metal TiSi (Si content: 58 at %), metal TiSi (Si content: 21 at %) and metal Si (B-doped polycrystal) were set as sputtering targets on cathodes, and the vacuum chamber was evacuated to $1.3 \times 10^{-3}$ Pa. Using a heat absorbing glass (VFL2) as a glass substrate set in the vacuum chamber, antireflection films were formed thereon as follows.

First Layer

As a discharge gas, a mixed gas of 100 sccm of argon and 500 sccm of oxygen was introduced. Here, the pressure was 0.35 Pa. Then, by reactive DC sputtering of TiSi (Si content: 58 at %), a mixed oxide film of Ti and Si having a film thickness of 90 nm (a refractive index of 1.85 at a wavelength of 550 nm) was formed.

Second Layer

Then, using the same discharge gas as in formation of the first layer, by reactive DC sputtering of TiSi (Si content: 21 at %), a mixed oxide film of Ti and Si having a film thickness of 160 nm (a refractive index of 2.2 at a wavelength of 550 nm) was formed.

Third Layer

Then, as a discharge gas, a mixed gas of 100 sccm of argon and 500 sccm of oxygen was introduced. Here, the pressure was 0.35 Pa. Then, by reactive DC sputtering of Si, a silicon oxide film having a film thickness of 120 nm (a refractive index of 1.46 at a wavelength of 550 nm) was formed.

The glass provided with antireflection films thus obtained was subjected to bending and lamination in the same manner as in Example 2. As another glass to form a laminated glass, a heat absorbing glass (VFL2) having the same size as said glass was used.

The obtained laminated glass was extraordinarily warped, and wrinkles were formed on the antireflection films.

COMPARATIVE EXAMPLE 3

In a vacuum chamber, metal TiSi (Si content: 58 at %) and metal Si (B-doped polycrystal) were set as sputtering targets on cathodes, and the vacuum chamber was evacuated to $1.3 \times 10^{-3}$ Pa. Using a transparent plate glass (FL2) as a glass substrate set in the vacuum chamber, antireflection films were formed thereon as follows.

First Layer

As a discharge gas, a mixed gas of 100 sccm of argon and 500 sccm of oxygen was introduced. Here, the pressure was 0.35 Pa. Then, by reactive DC sputtering of TiSi (Si content: 58 at %), a mixed oxide film of Ti and Si having a film thickness of 82 nm (a refractive index of 1.85 at a wavelength of 550 nm) was formed.

Second Layer

Then, as a discharge gas, a mixed gas of 100 sccm of argon and 500 sccm of oxygen was introduced. Here, the pressure was 0.35 Pa. Then, by reactive DC sputtering of Si, a silicon oxide film having a film thickness of 124 nm (a refractive index of 1.46 at a wavelength of 550 nm) was formed.

Then, the obtained glass provided with antireflection films was subjected to bending and lamination in the same manner as in Example 2. As another glass to form a laminated glass, a transparent plate glass (FL2) having the same size as said glass was used.

With respect to the obtained laminated glass, no change in appearance such as wrinkles, peeling or change in color was shown on the antireflection films, and no extraordinary warp of the glass plate was shown. However, the reflection color tone presented dark blue.

COMPARATIVE EXAMPLE 4

A laminated glass was prepared by carrying out bending and lamination in the same manner as in Example 3 except that a highly heat absorbing glass (UVFL2) was used instead of the glass provided with antireflection films obtained in Example 3.

Of the glasses provided with antireflection films and the like obtained in Examples 1 to 13 and Comparative Examples 1 to 4, the film stacks, and (a) refractive index, (b) film thickness (nm) as an antireflection condition, (c) film thickness (nm) and (d) the ratio (magnification) of film thickness relative to film thickness as an antireflection condition of each antireflection film layer, are shown in Table 9.

Each of the glasses provided with antireflection films obtained in Examples 1 to 6, 12 and 13 corresponds to the substrate provided with antireflection films of the fifth aspect of the present invention, as evident from (a) and (d) of each antireflection film layer. Further, each of the glasses provided with antireflection films obtained in Examples 1 to 6, 12 and 13 corresponds to the substrate provided with antireflection films of the sixth aspect of the present invention as evident from (a) and (c) of each antireflection film layer. Further, each of the glasses provided with antireflection films obtained in Examples 1 to 3, 12 and 13 corresponds to the substrate provided with antireflection films of the seventh aspect of the present invention.

Each of the glasses provided with antireflection films obtained in Examples 7 to 11 corresponds to the substrate provided with antireflection films of the second aspect of the present invention, as evident from (a) and (d) of each antireflection film layer. Further, each of the glasses provided with antireflection films obtained in Examples 7 to 11 corresponds to the substrate provided with antireflection films of the third aspect of the present invention as evident from (a) and (c) of each antireflection film layer. Further, each of the glasses provided with antireflection films obtained in Examples 7 to 9 corresponds to the substrate provided with antireflection films of the fourth aspect of the present invention.

On the other hand, Comparative Example 2 does not correspond to any of the substrates provided with antireflection films of the fifth, sixth, seventh and eighth aspects of the present invention, and Comparative Example 3 does not correspond to any of the substrates provided with antireflection films of the second, third and fourth aspects of the present invention.

carried out using a D65 light source in accordance with JIS R3106. Further, a C light source was used for measurements of (2) and (3).

(1) Transmittance (Tv) of visible light incident at an angle of incidence of 0°

(2) Spectral reflectance curve with respect to visible light incident at an angle of incidence of 5° from the film face side and reflected on the antireflection film face.

In order to measure the reflectance on the antireflection film face side alone, the non-film face at the side opposite to the antireflection film face side was coated with a black paint, and the reflectance at each wavelength was measured to prepare a spectral reflectance curve.

(3) Reflectance (Y) and reflection color tone (x, y) with respect to visible light incident at an angle of incidence of 5° from the non-film face side and reflected on both sides (including reflection on the antireflection film face side)

(4) Reflectance (Rv) with respect to visible light incident at an angle of incidence of 60° from the film face side and reflected on both sides (including reflection on the non-film face side (glass face side))

The value of Rv is preferably at most 12% practically, particularly preferably at most 10%.

Figure 8:
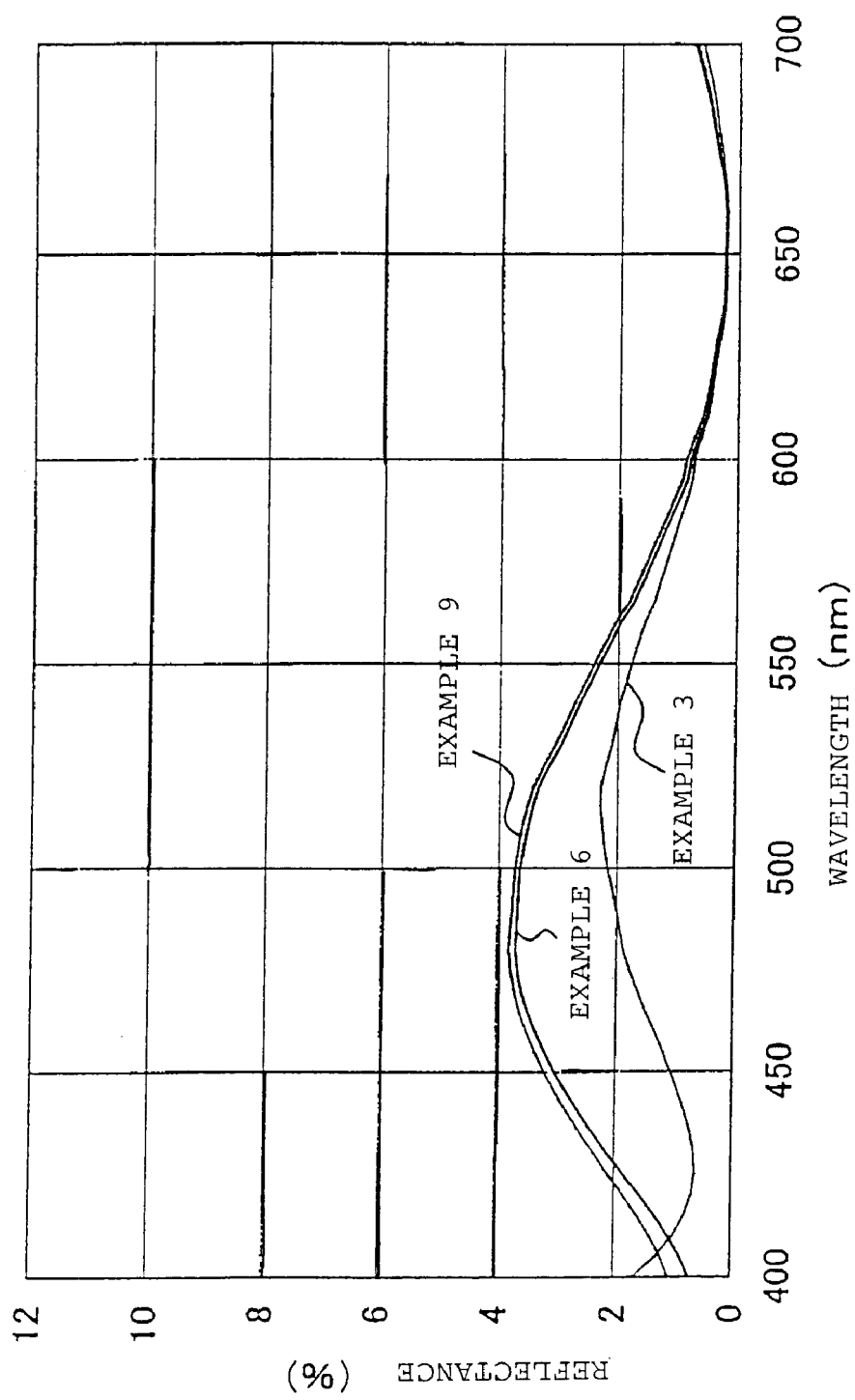
FIG. 8 is a diagram illustrating spectral reflectance curves with respect to visible light incident at an angle of incidence of 5° from the film face side, reflected on the antireflection film face.
Figure 9:
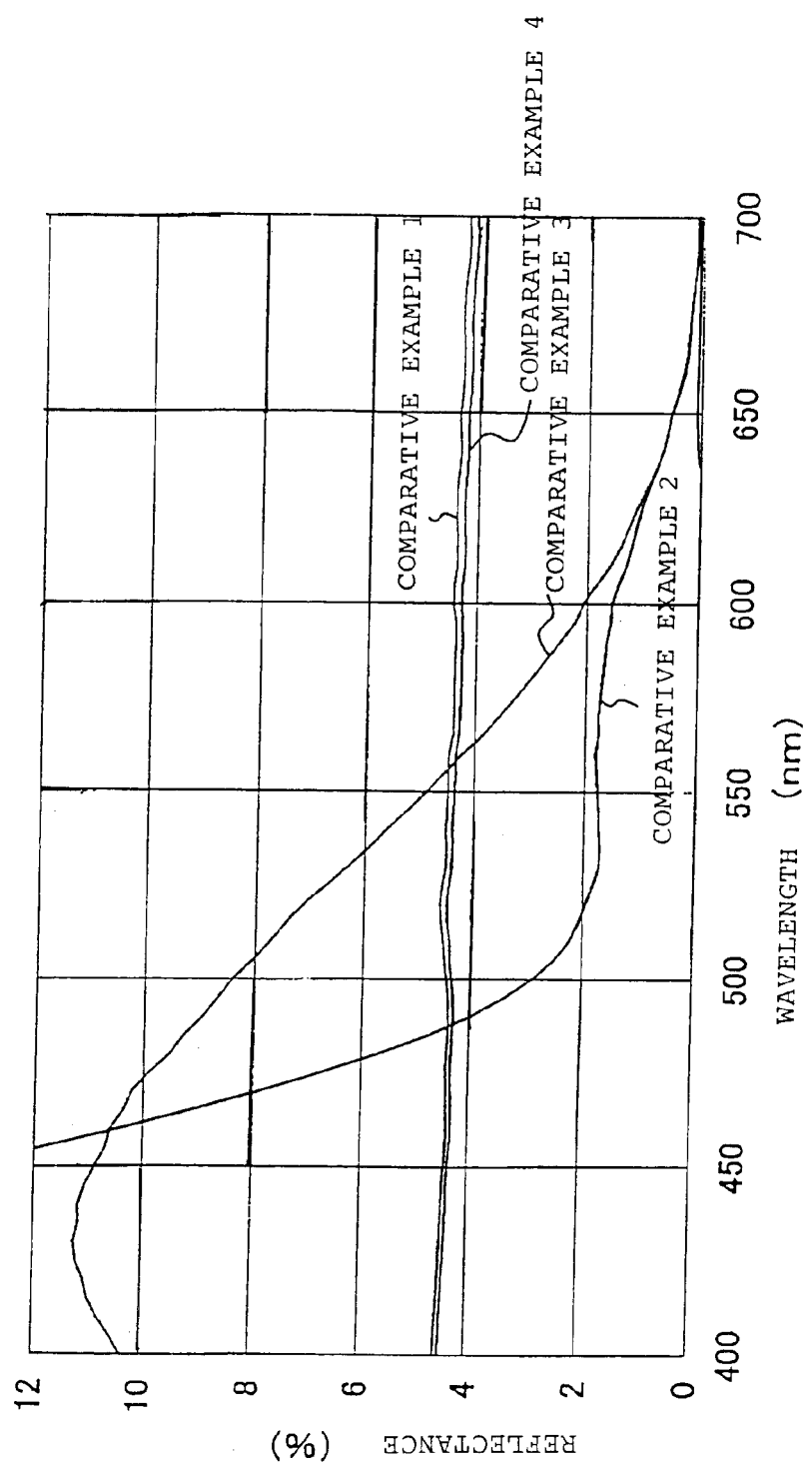
FIG. 9 is a diagram illustrating spectral reflectance curves with respect to visible light incident at an angle of incidence of 5° from the film face side, reflected on the antireflection film face.
Figure 10:
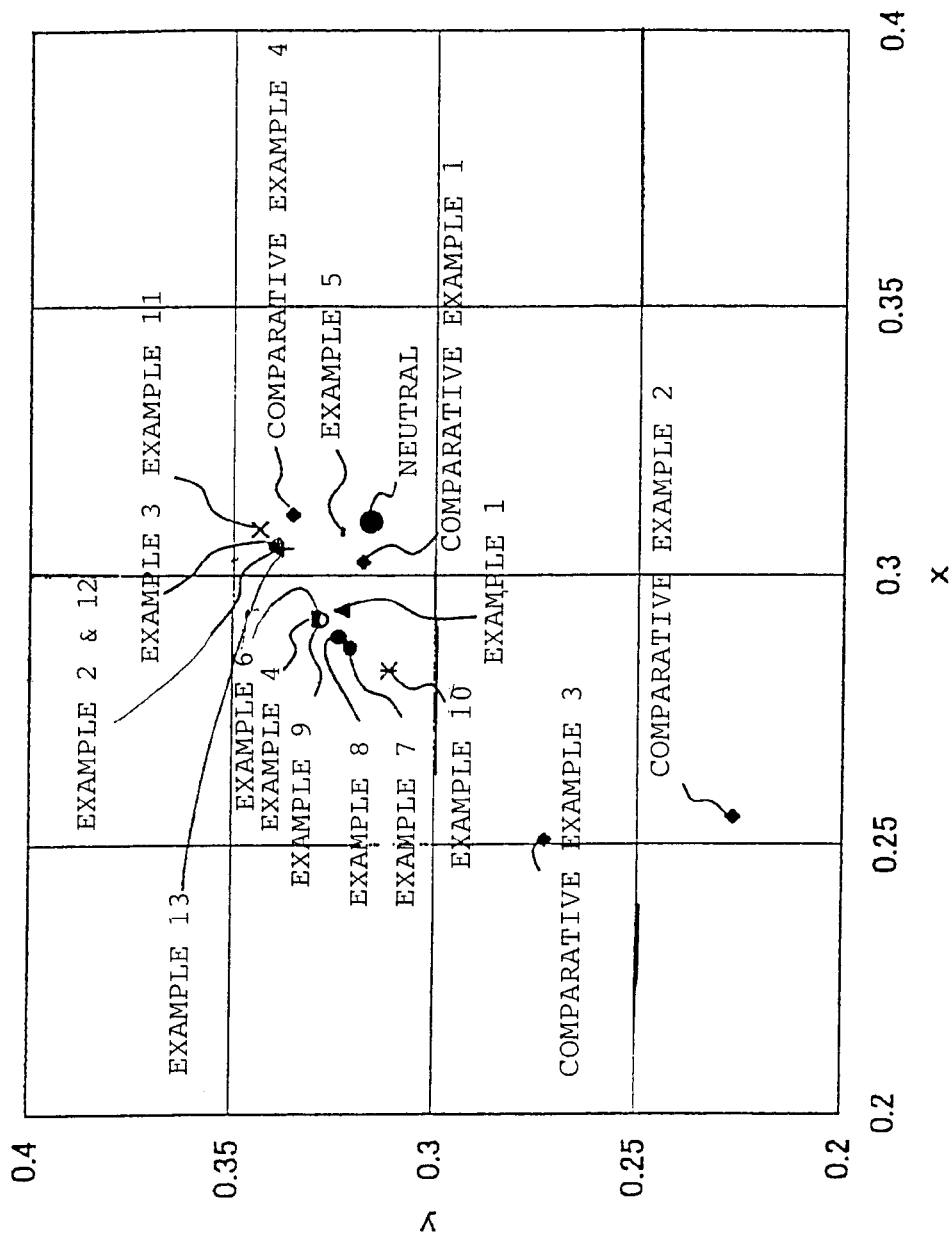
FIG. 10 is a diagram illustrating the reflection color tone (x, y) with respect to visible light incident at an angle of incidence of 5° from the non-film face side, reflected on both sides (including the reflection on the antireflection film face side).

The results of the above (1), (3) and (4) are shown in Table 10, the results of the above (2) are shown in FIGS. 6 to 9 and the results of the reflection color tone (x, y) of the above (3) are shown in FIG. 10.

Figure 6:
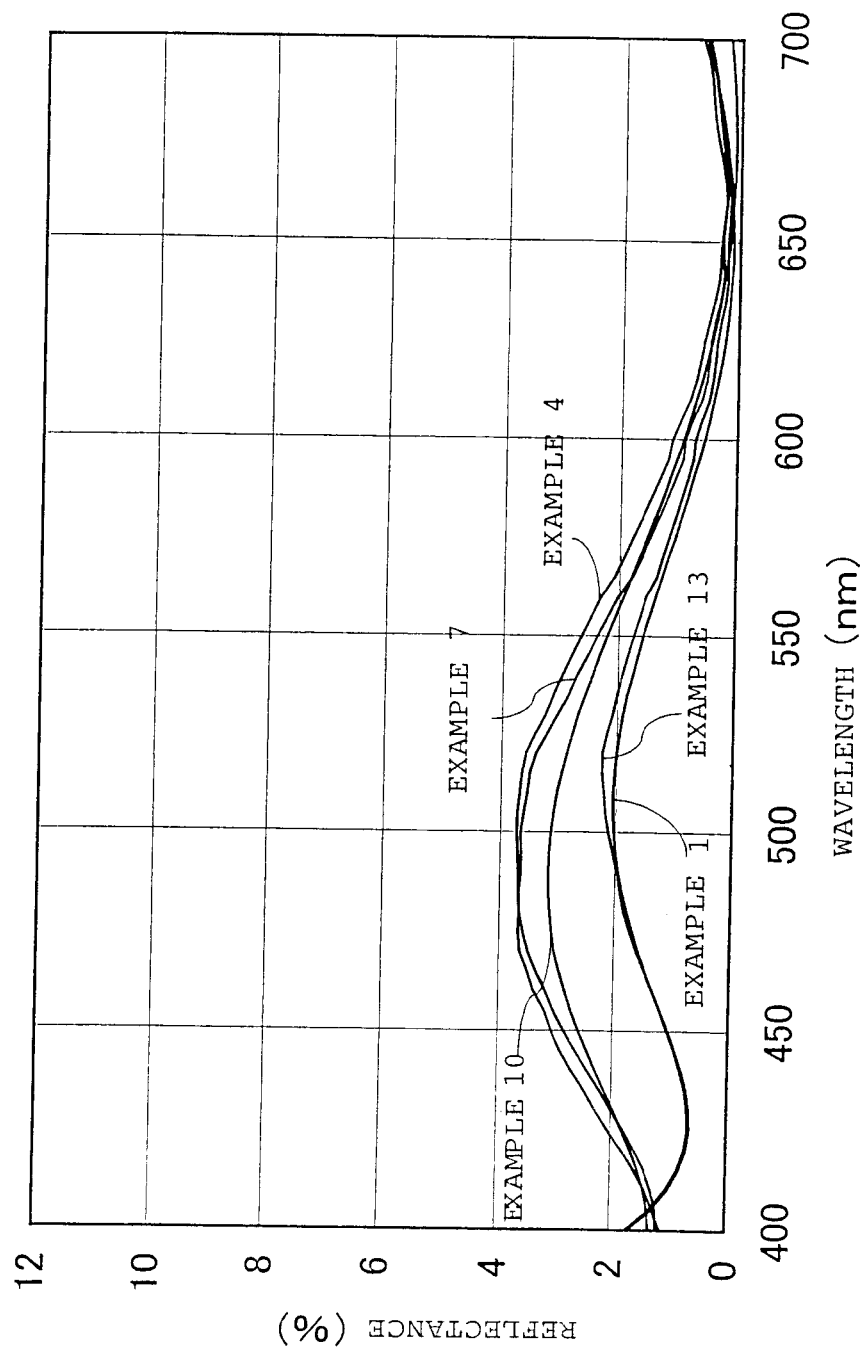
FIG. 6 is a diagram illustrating spectral reflectance curves with respect to visible light incident at an angle of incidence of 5° from the film face side, reflected on the antireflection film face.
Figure 7:
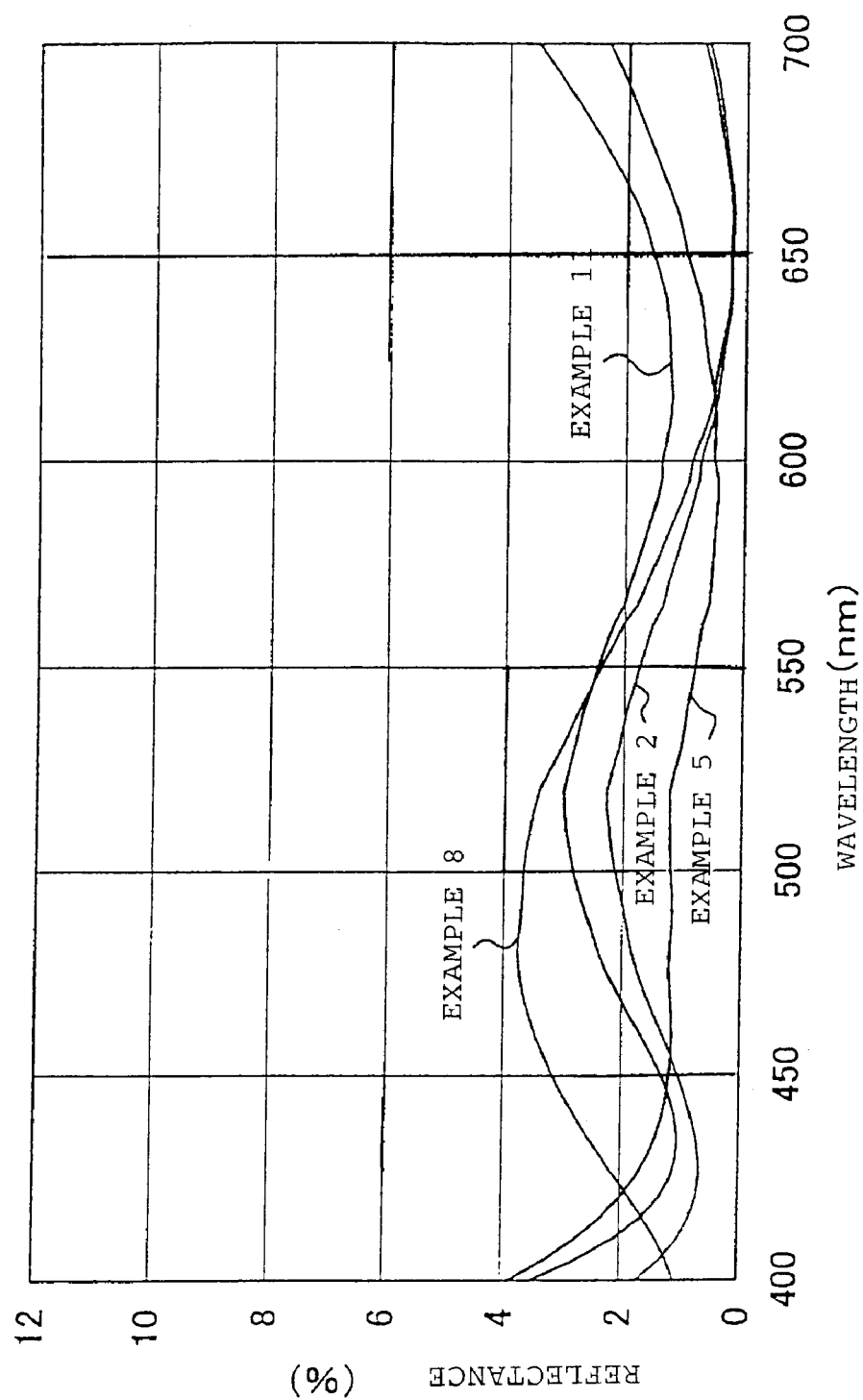
FIG. 7 is a diagram illustrating spectral reflectance curves with respect to visible light incident at an angle of incidence of 5° from the film face side, reflected on the antireflection film face.

With respect to glasses provided with antireflection films obtained in Examples 1 to 13, as evident from FIGS. 6 to 8, the reflectance on the film face of light incident at an angle of incidence of 5° from the film face side is at most 6% at the entire wavelength region ranging from 400 to 480 nm, and these glasses correspond to the substrate provided with antireflection films of the first aspect of the present inven-

TABLE 9

| | | First layer | | | | | Second layer | | | | | Third layer | | | | |
|---|---|---|---|---|---|---|---|---|---|---|---|---|---|---|---|---|
| | Constitution | Material | (a) | (b) | (c) | (d) | Material | (a) | (b) | (c) | (d) | Material | (a) | (b) | (c) | (d) |
| Ex. | | | | | | | | | | | | | | | | |
| 1 | VFL2 | $SnN_xO_y$ | 1.95 | 79 | 98 | 1.25 | $TiO_2$ | 2.4 | 61 | 13 | 0.21 | $SiO_2$ | 1.46 | 117 | 105 | 0.90 |
| 2 | VFL2-PVB-VFL2 | $SnN_xO_y$ | 1.95 | 79 | 98 | 1.25 | $TiO_2$ | 2.4 | 61 | 13 | 0.21 | $SiO_2$ | 1.46 | 117 | 105 | 0.90 |
| 3 | UVFL2-PVB-UVFL2 | $SnN_xO_y$ | 1.95 | 79 | 98 | 1.25 | $TiO_2$ | 2.4 | 61 | 13 | 0.21 | $SiO_2$ | 1.46 | 117 | 105 | 0.90 |
| 4 | VFL2-PVB-VFL2 | $ZnSn_xO_y$ | 1.95 | 79 | 105 | 1.33 | $TiO_2$ | 2.4 | 61 | 5 | 0.08 | $SiO_2$ | 1.46 | 117 | 103 | 0.88 |
| 5 | VFL2-PVB-VFL2 | $TiSi_xO_y$ | 1.95 | 79 | 80 | 1.01 | $TiO_2$ | 2.4 | 61 | 25 | 0.41 | $SiO_2$ | 1.46 | 117 | 103 | 0.88 |
| 6 | UVFL2-PVB-UVFL2 | $TiO_2$ | 2.4 | 61 | 4 | 0.06 | $TiSi_xO_y$ | 1.95 | 79 | 107 | 1.36 | $SiO_2$ | 1.46 | 117 | 93 | 0.79 |
| 7 | FL2-PVB-FL2 | $SnN_xO_y$ | 1.95 | 79 | 114 | 1.45 | $SiO_2$ | 1.46 | 117 | 95 | 0.81 | — | — | — | — | — |
| 8 | VFL2-PVB-VFL2 | $SnN_xO_y$ | 1.95 | 79 | 114 | 1.45 | $SiO_2$ | 1.46 | 117 | 95 | 0.81 | — | — | — | — | — |
| 9 | UVFL2-PVB-UVFL2 | $SnN_xO_y$ | 1.95 | 79 | 114 | 1.45 | $SiO_2$ | 1.46 | 117 | 95 | 0.81 | — | — | — | — | — |
| 10 | VFL2 | $ZrSi_xO_y$ | 1.80 | 87 | 128 | 1.47 | $SiO_2$ | 1.46 | 117 | 95 | 0.81 | — | — | — | — | — |
| 11 | UVFL2-PVB-UVFL2 | $TiO_2$ | 2.4 | 61 | 106 | 1.73 | $SiO_2$ | 1.46 | 117 | 87 | 0.75 | — | — | — | — | — |
| 12 | VFL2-PVB-VFL2($N_2O$) | $SnN_xO_y$ | 1.95 | 79 | 98 | 1.25 | $TiO_2$ | 2.4 | 61 | 13 | 0.21 | $SiO_2$ | 1.46 | 117 | 105 | 0.90 |
| 13 | UVFL2-PVB-VFL2 ($N_2O$) | $SnN_xO_y$ | 1.95 | 79 | 98 | 1.25 | $TiO_2$ | 2.4 | 61 | 13 | 0.21 | $SiO_2$ | 1.46 | 117 | 105 | 0.90 |
| Comp. Ex. | | | | | | | | | | | | | | | | |
| 1 | VFL2-PVB-VFL2 | — | — | — | — | — | — | — | — | — | — | — | — | — | — | — |
| 2 | VFL2-PVB-VFL2 | $TiSi_xO_y$ | 1.85 | 84 | 90 | 1.07 | $TiSi_xO_y$ | 2.2 | 68 | 160 | 2.35 | $SiO_2$ | 1.46 | 117 | 120 | 1.03 |
| 3 | FL2-PVB-FL2 | $TiSi_xO_y$ | 1.85 | 84 | 82 | 0.98 | $SiO_2$ | 1.46 | 117 | 124 | 1.06 | — | — | — | — | — |
| 4 | UVFL2-PVB-UVFL2 | — | — | — | — | — | — | — | — | — | — | — | — | — | — | — |

2. Evaluation of Substrate Provided with Antireflection Films

Of the glasses obtained in Examples 1 to 13 and Comparative Examples 1 to 4, the following optical properties (1) to (4) were measured. Measurements of (1) and (4) were tion. Here, the spectral reflectance curve of Example 12 was the same as that of Example 2.

On the other hand, Comparative Examples 2 and 3 do not correspond to the substrate provided with antireflection films of the first aspect of the present invention as evident from FIG. 9.

The glasses provided with antireflection films obtained in Examples 1 to 13 have a decreased Rv (reflectance on the film face side at an angle of incidence of 60°) as compared with a conventional laminated glass having no antireflection film (Comparative Example 1), and have substantially the same Rv as that of conventional glasses provided with antireflection films (Comparative Examples 2 and 3) (Table 10 (4)).

Further, Tv (visible light transmittance at an angle of incidence of 0°) is at least 75% even when a laminated glass is prepared by using two highly heat absorbing glasses (UVFL2) (Examples 3, 6, 9 and 11), and the transmittance of a windshield for an automobile as regulated in each country is satisfied, and a transparent substrate can be freely selected depending upon the purpose (Table 10 (1)).

The glasses provided with antireflection films obtained in Examples 1 to 13 have a reduced reflectance (Y) with respect to visible light incident at an angle of incidence of 5° from the non-film face side and reflected on both sides as compared with Comparative Example 1 (Table 10 (3)). Further, it is found that the reflection color tone (x, y) is close to that of a C light source, and is close to neutral ((x, y)=(0.3101, 0.3162)) (FIG. 10).

On the other hand, with respect to a conventional common glass provided with antireflection films of three layers (Comparative Example 2) or two layers (Comparative Example 3) which is designed so that the reflectance on the film face side at an angle of incidence of 60° becomes minimum with a purpose of preventing reflection of the dashboard, the reflection color tone (x, y) with respect to visible light incident at an angle of incidence of 5° from the non-film face side and reflected on both sides is smaller than that of a C light source with respect to both x and y, and the reflection color tone tends to be bluish (FIG. 10).

Further, as mentioned above, the transmittance (Tv) of visible light incident at an angle of incidence of 0° is at least 75% with the glasses provided with antireflection films using a highly heat absorbing glass obtained in Examples 3, 6, 9, 11 and 13, whereas it is less than 75% in Comparative Example 4 wherein no antireflection film is used, and the transmittance of a windshield for an automobile as regulated in Europe, Australia and other countries can not be satisfied (Table 10 (1)).

TABLE 10

|  | (1) | (3) | | (4) |
| --- | --- | --- | --- | --- |
|  | Tv | Y | x | y | Rv |
| Ex. 1 | 88.2 | 5.4 | 0.2936 | 0.3234 | 10.7 |
| Ex. 2 | 82.0 | 6.0 | 0.3051 | 0.3398 | 9.7 |
| Ex. 3 | 76.2 | 5.7 | 0.3059 | 0.3403 | 8.6 |
| Ex. 4 | 81.2 | 6.6 | 0.2920 | 0.3302 | 9.7 |
| Ex. 5 | 82.5 | 5.5 | 0.3075 | 0.3233 | 10.5 |
| Ex. 6 | 75.7 | 6.0 | 0.2923 | 0.3290 | 8.6 |
| Ex. 7 | 91.6 | 6.9 | 0.2867 | 0.3213 | 11.9 |
| Ex. 8 | 81.4 | 6.4 | 0.2887 | 0.3240 | 9.8 |
| Ex. 9 | 75.6 | 6.1 | 0.2919 | 0.3284 | 8.6 |
| Ex. 10 | 87.7 | 5.9 | 0.2825 | 0.3116 | 10.9 |
| Ex. 11 | 75.6 | 6.1 | 0.3086 | 0.3437 | 9.4 |
| Ex. 12 | 82.0 | 6.0 | 0.3051 | 0.3398 | 9.7 |
| Ex. 13 | 79.1 | 5.7 | 0.3049 | 0.3396 | 9.1 |
| Comparative Example 1 | 78.7 | 7.1 | 0.3025 | 0.3180 | 14.5 |
| Comparative Example 2 | 81.5 | 6.4 | 0.2553 | 0.2268 | 9.7 |
| Comparative Example 3 | 89.3 | 9.1 | 0.2510 | 0.2726 | 11.9 |
| Comparative Example 4 | 74.0 | 7.3 | 0.3114 | 0.3354 | 13.1 |

The substrate provided with antireflection films of the present invention is a substrate provided with antireflection films which is excellent in antireflection properties to incident light at an oblique angle from the film face side and has a high transmittance, with which the reflection color tone does not tend to be bluish not only in a case where the angle of incidence of visible light incident from the non-film face side is great but also in a case where it is small, and a reflection color tone close to neutral can be obtained. Accordingly, it is preferred to use the substrate provided with antireflection films of the present invention for e.g. a windshield of an automobile in such a manner that the film face side faces the interior side and the non-film face side faces the exterior side, in view of excellent antireflection properties and appearance design.

Further, in a case where the substrate provided with antireflection films of the present invention is a substrate provided with antireflection films which is excellent also in heat resistance, it is possible to carry out a heat treatment (e.g. bending or tempering) after film formation in production process, whereby production efficiency improves, and the substrate provided with antireflection films can be easily produced.

What is claimed is:

1. A substrate provided with antireflection films, which comprises a transparent substrate and two or three antireflection film layers deposited on one side of the transparent substrate in an order in which the first layer is deposited on one side of the transparent substrate, the second layer is deposited on the first layer on the side distal to the transparent substrate, and the third layer, when present, is deposited on the second layer on the side distal to the first layer, wherein the reflectance on the film face of light incident at an angle of incidence of 5° from the film face side is at most 6% at the entire wavelength region ranging from 400 to 480 nm, and wherein the first layer is a thin film having a refractive index of from 1.6 to 2.6 and a geometrical film thickness of from 1.1 to 1.9 times the film thickness as an antireflection condition as obtained from the following formula; and the second layer is a thin film having a refractive index of from 1.4 to 1.56 and a geometrical film thickness of from 0.5 to 1.1 times the film thickness as an antireflection condition as obtained from the following formula:

$$d=\lambda/[4n\{1-(\sin\theta/n)^2\}^{1/2}]$$

wherein d is a film thickness as an antireflection condition of each layer, n is a refractive index of each layer, $\lambda=550$ nm and $\theta=60°$, and also wherein the Rv reflectance with respect to visible light incident at an angle of incidence of 60° from the film face side and reflected on both sides, including reflection on the non-film, transparent substrate, side is at most 12%.

2. The substrate provided with antireflection films according to claim 1, wherein
the first layer is a thin film having a refractive index of from 1.6 to 2.6 and a geometrical film thickness of from 60 to 200 nm; and
the second layer is a thin film having a refractive index of from 1.4 to 1.56 and a geometrical film thickness of from 50 to 140 nm.

3. The substrate provided with antireflection films according to claim 1, wherein the first layer is a thin film containing an oxide, an oxynitride or an oxycarbide of at least one element selected from the group consisting of titanium, silicon, zinc, aluminum, tin, zirconium, tantalum, tungsten, bismuth and niobium, or a nitride or a nitrogen carbide of at least one element selected from the group consisting of silicon, aluminum and boron.

4. The substrate provided with antireflection films according to claim 1, wherein the second layer is a thin film containing an oxide of silicon.

5. The substrate provided with antireflection films according to claim 1, wherein
the first layer is a tin oxynitride film having a geometrical film thickness of from 104 to
124 nm; and
the second layer is a silicon oxide film having a geometrical film thickness of from 85 to 105 nm.

6. The substrate provided with antireflection films according to claim 1, which comprises a transparent substrate and first, second and third antireflection film layers deposited in this order on one side of the transparent substrate,
wherein the first and second layers are thin films having compositions which are different from each other, each containing an oxide, an oxynitride or an oxycarbide of at least one element selected from the group consisting of titanium, silicon, zinc, aluminum, tin, zirconium, tantalum, tungsten, bismuth and niobium, or a nitride or a nitrogen carbide of at least one element selected from the group consisting of silicon, aluminum and boron.

7. The substrate provided with antireflection films according to claim 1, which comprises a transparent substrate and first, second and third antireflection film layers deposited in this order on one side of the transparent substrate,
wherein the third layer is a thin film containing an oxide of silicon.

8. The substrate provided with antireflection films according to claim 1, which comprises a transparent substrate and first, second and third antireflection film layers deposited in this order on one side of the transparent substrate,
wherein the total thickness of the three antireflection film layers (sum of the film thicknesses of the first, second and third layers) is less than 250 nm.

9. The substrate provided with antireflection films according to claim 1, wherein each layer has an extinction coefficient of at most 0.05 at the visible light region.

10. A method for producing a substrate provided with antireflection films, which comprises subjecting the substrate provided with antireflection films as defined in claim 1 to a heat treatment to produce the substrate provided with antireflection films having bending or tempering applied thereto.

11. A method for producing a laminated glass, which comprises subjecting the substrate provided with antireflection films as defined in claim 1 wherein the transparent substrate is glass, to bending into a three-dimensional curved shape by a heat treatment, and laminating the glass substrate provided with antireflection films subjected to bending and another glass substrate having approximately the same shape by means of an intermediate film.

12. A window glass for an automobile which uses the substrate provided with antireflection films as defined in claim 1.

13. The substrate provided with antireflection films according to claim 1, wherein the first layer is a tin oxynitride film having a nitrogen content ranging from 0 at % to 4 at %.

14. The substrate provided with antireflection films according to claim 1, wherein the transparent substrate is glass or plastic.

15. The substrate provided with antireflection films according to claim 1, wherein the transparent substrate is a glass selected from the group consisting of transparent float glass, colored float glass, transparent heat absorbing glass, and colored heat absorbing glass.

16. The substrate provided with antireflection films according to claim 1, wherein the transparent substrate is a plastic selected from the group consisting of transparent polycarbonate, colored polycarbonate, transparent polymethyl methacrylate, and colored polymethyl methacrylate.

* * * * *